United States Patent
Ueno et al.

(10) Patent No.: US 10,651,609 B2
(45) Date of Patent: May 12, 2020

(54) METHOD OF MANUFACTURING PHYSICAL QUANTITY SENSOR DEVICE AND PHYSICAL QUANTITY SENSOR DEVICE

(71) Applicant: FUJI ELECTRIC CO., LTD., Kawasaki-shi, Kanagawa (JP)

(72) Inventors: Fumiya Ueno, Matsumoto (JP); Kimihiro Ashino, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 343 days.

(21) Appl. No.: 15/858,729

(22) Filed: Dec. 29, 2017

(65) Prior Publication Data

US 2018/0241160 A1    Aug. 23, 2018

(30) Foreign Application Priority Data

Feb. 23, 2017 (JP) ................. 2017-032741

(51) Int. Cl.
*H01R 13/66* (2006.01)
*H01R 43/20* (2006.01)
*G01D 11/24* (2006.01)
*G01P 1/02* (2006.01)
(Continued)

(52) U.S. Cl.
CPC ....... *H01R 13/6683* (2013.01); *G01D 11/245* (2013.01); *G01L 19/143* (2013.01); *G01P 1/023* (2013.01); *G01P 1/026* (2013.01); *H01R 13/6625* (2013.01); *H01R 43/205* (2013.01); *H01R 43/24* (2013.01)

(58) Field of Classification Search
CPC ............ H01R 13/6683; H01R 13/6625; H01R 43/24; H01R 43/205; G01D 11/245; G01P 1/023; G01P 1/026; G01L 19/143
USPC .......................................................... 73/756
See application file for complete search history.

(56) References Cited

U.S. PATENT DOCUMENTS

| 6,601,453 B2 * | 8/2003 | Miyazaki ............ G01L 19/0038 73/753 |
| 6,678,164 B2 * | 1/2004 | Chikuan ............. G01L 19/0084 361/752 |

(Continued)

FOREIGN PATENT DOCUMENTS

| JP | 4045988 B2 | 2/2008 |
| JP | 4240790 B2 | 3/2009 |

(Continued)

*Primary Examiner* — Nathaniel T Woodward
(74) *Attorney, Agent, or Firm* — Rabin & Berdo, P.C.

(57) ABSTRACT

A first connector pin to a third connector pin have a substantially L-shaped cross-sectional shape formed by a horizontal part embedded in the top of an inner housing part by resin molding and a vertical part continuous with and protruding upwardly orthogonal to the horizontal part. A fourth connector pin has a substantially I-shaped cross-sectional shape having only the vertical part. The horizontal part of the first connector pin is provided so as to surround the first end of the first connector pin, the horizontal part and the first end of the second connector pin, the horizontal part and the first end of the third connector pin, and is integrated and connected to the fourth connector pin. A chip capacitor is attached to the connector pins by a joining member. Thus, the connector pins are connected to each other via the chip capacitors.

17 Claims, 21 Drawing Sheets

(51) Int. Cl.
*G01L 19/14* (2006.01)
*H01R 43/24* (2006.01)

(56) References Cited

U.S. PATENT DOCUMENTS

| | | | | |
|---|---|---|---|---|
| 7,347,737 | B2* | 3/2008 | Horiba | H01R 13/6464 |
| | | | | 439/676 |
| 7,686,651 | B2* | 3/2010 | Shinjo | G01L 19/0084 |
| | | | | 439/620.22 |
| 2005/0204823 | A1* | 9/2005 | Murai | G01L 19/0084 |
| | | | | 73/724 |
| 2008/0236307 | A1* | 10/2008 | Watanabe | G01D 11/245 |
| | | | | 73/865.8 |
| 2012/0306484 | A1* | 12/2012 | Mizutani | G01D 5/145 |
| | | | | 324/244 |
| 2014/0338448 | A1* | 11/2014 | Ashino | G01P 15/08 |
| | | | | 73/488 |

FOREIGN PATENT DOCUMENTS

| | | | |
|---|---|---|---|
| JP | 4301048 | B2 | 7/2009 |
| JP | 5712799 | B2 | 5/2015 |
| JP | 2017-37039 | A | 2/2017 |
| WO | WO-2013/118843 | A1 | 8/2013 |

* cited by examiner

METHOD OF MANUFACTURING PHYSICAL QUANTITY SENSOR DEVICE AND PHYSICAL QUANTITY SENSOR DEVICE

CROSS REFERENCE TO RELATED APPLICATIONS

This application is based upon and claims the benefit of priority of the prior Japanese Patent Application No. 2017-032741, filed on Feb. 23, 2017, the entire contents of which are incorporated herein by reference.

BACKGROUND OF THE INVENTION

1. Field of the Invention

Embodiments of the invention relate to a method of manufacturing a physical quantity sensor device and a physical quantity sensor device.

2. Description of the Related Art

Numerous physical quantity sensors are used in automobiles and industrial equipment. Physical quantity sensors include pressure sensors, acceleration sensors, etc. and are often used in harsh environments with high temperatures and humidity. According to a proposed technique, in a physical quantity sensor device, the package is configured by a screw part and a nut part (case) in which a sensing element is disposed in a recess, and a socket part constituting an interface for propagating sensing element signals externally (for example, refer to International Publication No. WO 2013/118843). For instance, with the technique proposed in International Publication No. WO 2013/118843, a noise suppressing substrate is provided in a recess of the socket part to attach a chip capacitor for noise suppression to an external lead terminal that is for leading out the sensing element signals and the chip capacitor is provided on the noise suppressing substrate. Further, for example, with the technique proposed in International Publication No. WO 2013/118843, a through-hole for the external lead terminal is provided in the noise suppressing substrate, and with the external lead terminal penetrating the through-hole of the noise suppressing substrate, the external lead terminal and the noise suppressing substrate are connected by soldering. Further, for example, with the technique proposed in International Publication No. WO 2013/118843, terminals for trimming and property adjustment of the sensing element are not used during actual use of the physical quantity sensor device and therefore, are configured to be shorter than the external lead terminal and do not penetrate the noise suppressing substrate.

SUMMARY OF THE INVENTION

According to an embodiment of the present invention, in a method of manufacturing a physical quantity sensor device, the physical quantity sensor device includes: a sensor; a control circuit electrically connected to the sensor; a first housing part that is a resin member to which the control circuit is connected and in which external lead terminals, each including a connector part for connecting to external wiring, are arranged; and an auxiliary terminal connected with a first external lead terminal and arranged in the first housing part, closer to a second external lead terminal than to the first external lead terminal. The method includes electrically joining a capacitor between each pair of adjacent terminals among the auxiliary terminal and the external lead terminals.

In the embodiment, the physical quantity sensor device includes: a measured-medium intake part that has an intake hole that guides a measured medium that is one of a gas subject to measurement and a liquid subject to measurement; and a sensor element arranged so as to cover the intake hole at one end of the intake hole of the measured-medium intake part, the sensor element having a sensor chip that includes the sensor and the control circuit. The first housing part includes: a second housing part that sandwiches the sensor element with the measured-medium intake part and that houses first terminals that are electrically connected with the control circuit and arranged in the sensor element, the auxiliary terminal and the external lead terminals being arranged in the second housing part, and a third housing part that sandwiches the second housing part with the sensor element and that houses the external lead terminals and the auxiliary terminal.

In the embodiment, the method includes fixing the second housing part to the sensor element, where fixing the second housing part to the sensor element includes inserting into grooves of the second housing part, second terminals that are arranged in the sensor element and that are for trimming and/or adjustment of the control circuit.

In the embodiment, the second terminals and the first terminals have a same length.

In the embodiment, the external lead terminals are integrated with the second housing part, the external lead terminals each having a first part embedded in the second housing part and a second part protruding outside the second housing part. The auxiliary terminal is integrated with the second housing part. The first part of the first external lead terminal is connected with the auxiliary terminal. The method includes fixing the second housing part to the sensor element, where fixing the second housing part to the sensor element includes electrically connecting the first terminals and the first part of some of the external lead terminals exposed in through-holes provided in the second housing part.

In the embodiment, the external lead terminals and the auxiliary terminal are arranged in a line.

In the embodiment, an axial portion of the auxiliary terminal and an axial portion of the first external lead terminal are at opposite ends of the line.

In the embodiment, the method includes fixing the third housing part to the second housing part, where fixing the third housing part to the second housing part includes inserting the external lead terminals into through-holes of the third housing part to expose the external lead terminals from the third housing part.

In the embodiment, the second housing part has a window in which parts for attaching the capacitor to the auxiliary terminal and the external lead terminals are exposed. The method includes filling the window with a resin material after electrically joining the capacitor between the adjacent terminals among the auxiliary terminal and the adjacent external lead terminals, where electrically joining the capacitor between the adjacent terminals among the auxiliary terminal and the respective external lead terminals includes electrically joining the capacitor between the adjacent terminals exposed from the window.

According to another embodiment of the present invention, a physical quantity sensor device includes a sensor; a control circuit electrically connected to the sensor; a first housing part that is a resin member to which the control circuit is connected, and in which external lead terminals, each including a connector part for connecting to external wiring; an auxiliary terminal connected with a first external lead terminal and arranged in the first housing part, closer to a second external lead terminal than to the first external lead terminal; and a capacitor electrically joined between each pair of adjacent terminals among the auxiliary terminal and the respective external lead terminals.

In the embodiment, the physical quantity sensor device includes a measured-medium intake part that has an intake hole that guides a measured medium that is one of a gas subject to measurement and a liquid subject to measurement; a sensor element arranged so as to cover the intake hole at one end of the intake hole of the measured-medium intake part, the sensor element having a sensor chip that includes the sensor and the control circuit; and first terminals arranged in the sensor element. The first housing part includes: a second housing part that sandwiches the sensor element with the measured-medium intake part and that houses the first terminals, the auxiliary terminal and the external lead terminals being arranged in the second housing part; and a third housing part that sandwiches the second housing part with the sensor element and that houses the external lead terminals and the auxiliary terminal.

In the embodiment, the physical quantity sensor device includes second terminals that are arranged in the sensor element and that are for trimming and/or adjustment of the control circuit. The second terminals are housed in grooves of the second housing part.

In the embodiment, the second terminals and the first terminals have a same length.

In the embodiment, the external lead terminals are integrated with the second housing part, the external lead terminals each having a first part embedded in the second housing part and a second part protruding outside the second housing part. The auxiliary terminal is integrated with the second housing part. The first part of the first external lead terminal is connected to the auxiliary terminal. The first terminals and the first part of some of the external lead terminals exposed in through-holes provided in the second housing part are electrically connected.

In the embodiment, the external lead terminals and the auxiliary terminal are arranged in a line.

In the embodiment, the auxiliary terminal and the first external lead terminal are arranged at opposite ends of the line.

In the embodiment, the external lead terminals penetrate through-holes of the third housing part and are exposed from the third housing part. The auxiliary terminal is housed in a groove of the third housing part.

Objects, features, and advantages of the present invention are specifically set forth in or will become apparent from the following detailed description of the invention when read in conjunction with the accompanying drawings.

DETAILED DESCRIPTION OF THE INVENTION

Figure 1:
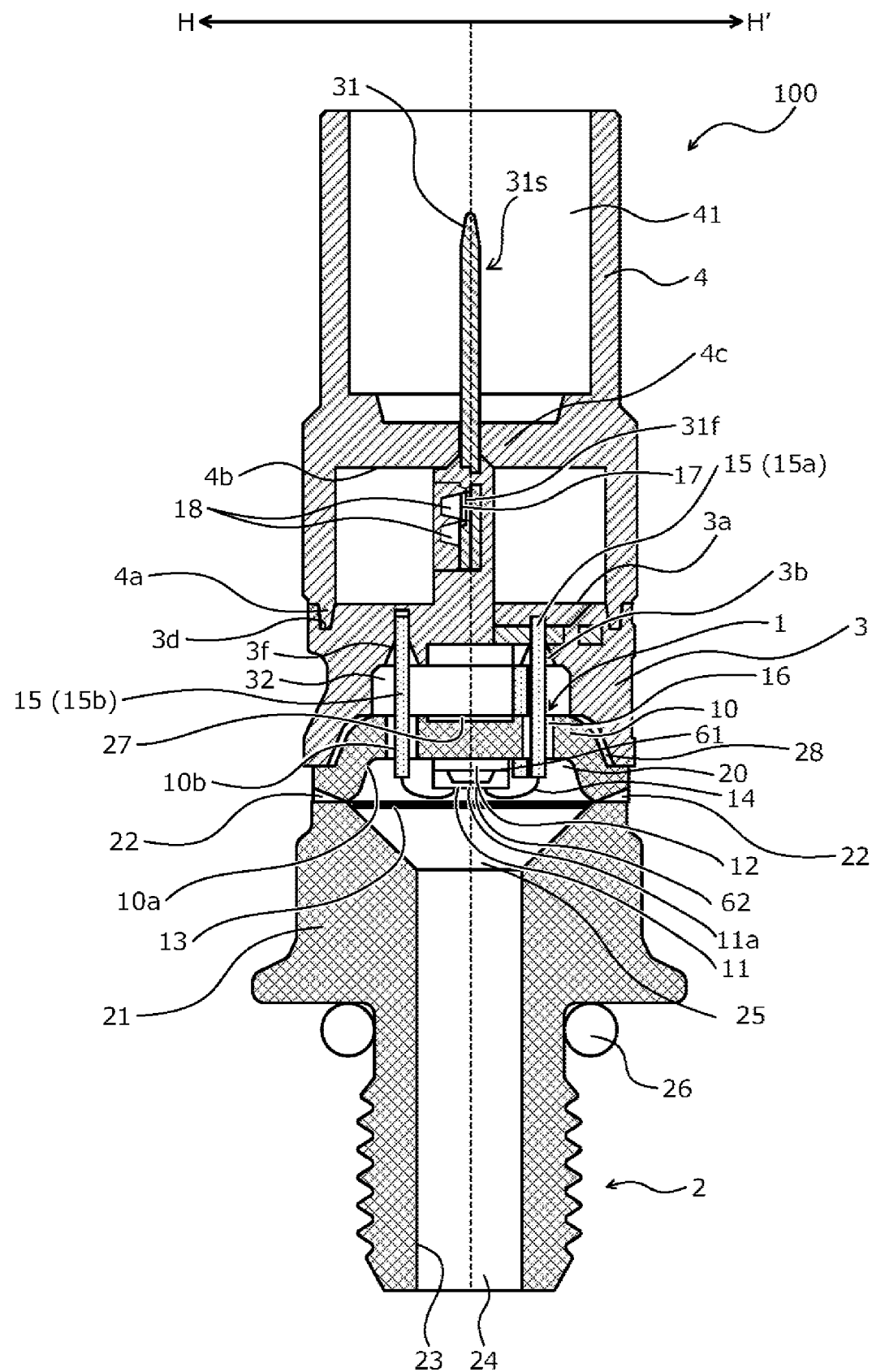
FIG. 1 is a cross-sectional view of a configuration of a physical quantity sensor device according to a first embodiment.

With the technique described in International Publication No. WO 2013/118843, the following problems arise. In the physical quantity sensor device described in International Publication No. WO 2013/118843, provision of the chip capacitor for noise suppression requires the provision of the noise suppressing substrate for disposing the chip capacitor whereby the cost for the noise suppressing substrate is incurred. Further, in the method of assembling (method of manufacturing) the physical quantity sensor device, processes for providing the noise suppressing substrate in the recess of the socket part are necessary. Further, for example, when no through-holes are provided in the noise suppressing substrate for the terminals for trimming and property adjustment of the sensing element, in the method of manufacturing the physical quantity sensor device, a cutting process is necessary to shorten the terminals that are for trimming and property adjustment of the sensing element.

Embodiments of a method of manufacturing a physical quantity sensor device and a physical quantity sensor device according to the present invention will be described in detail with reference to the accompanying drawings. In the description of the embodiments, components that are similar are given the same reference numerals and redundant description is omitted.

Figure 2A:
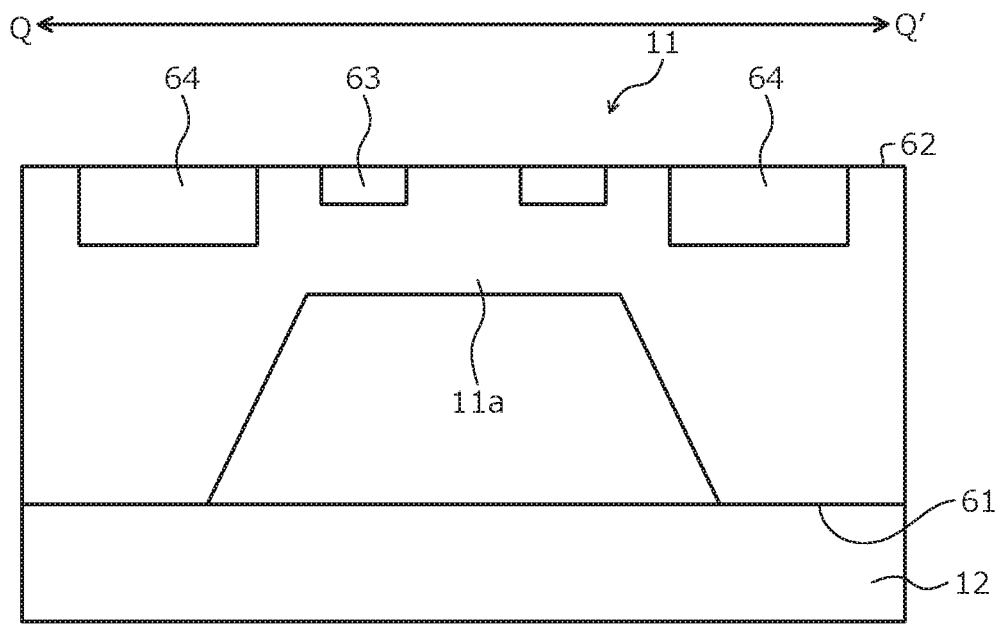
FIG. 2A is a cross-sectional view of a pressure sensor chip.
Figure 2B:
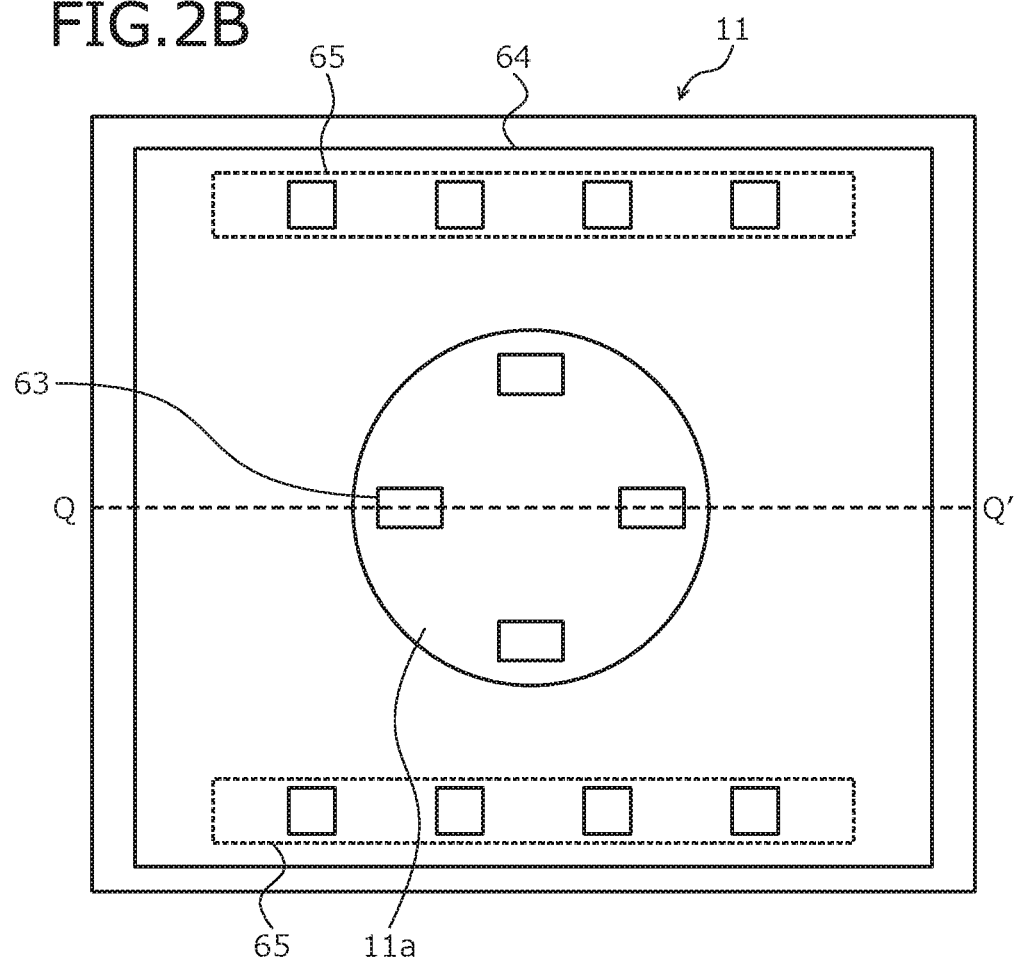
FIG. 2B is a plan view of the pressure sensor chip.

Configuration of the physical quantity sensor device according to a first embodiment will be described taking a pressure sensor device as an example. FIG. 1 is a cross-sectional view of the configuration of the physical quantity sensor device according to the first embodiment. FIGS. 2A and 2B are diagrams of the configuration of a pressure sensor chip depicted in FIG. 1. FIG. 2A is a cross-sectional view of a pressure sensor chip 11 and FIG. 2B is a plan view of the pressure sensor chip 11. As depicted in FIG. 1, a physical quantity sensor device 100 includes a sensor element 1, a screw part 2 (measured-medium intake part), an inner housing part (second housing part) 3, and a socket housing part (connector housing part (third housing part)) 4.

In the present embodiment, a socket part constituting an interface for propagating sensing element signals externally is configured to be separate from both the inner housing part 3 and the socket housing part 4. The sensor element 1 includes a case 10 as well as the pressure sensor chip (semiconductor chip) 11, a base member 12, and a diaphragm 13, each housed in a recess 10a of the case 10. The cross-section depicted in FIG. 1 is a cross-section at the position of a cross-section H-H' depicted in FIG. 12B described hereinafter. The case 10, for example, is made of a metal such as stainless steel (SUS) or the like.

As depicted in FIGS. 2A and 2B, the pressure sensor chip 11 has, for example, a diaphragm 11a, four gauge resistors 63, and a pad member 65. The diaphragm 11a is a member that is subjected to pressure and is formed by processing that forms a recess from a first surface 61 of semiconductor silicon. The first surface 61 is the upper surface in FIG. 1. The pressure sensor chip 11 is subjected to pressure via the diaphragm 11a. The four gauge resistors 63 are formed on a second surface 62 of the semiconductor silicon, the second surface 62 corresponds to a rear side of the diaphragm 11a. The second surface 62 is the lower surface in FIG. 1. The four gauge resistors 63 are constituted by diffused resistors. The gauge resistors 63 convert into values of resistance, distortion that is generated at the second surface 62 when pressure is applied to the pressure sensor chip 11. The pressure sensor chip 11 may be made of another semiconductor material.

In the pressure sensor chip 11, a pressure sensor such as a Wheatstone bridge circuit configured by the gauge resistors 63, a control circuit, etc. are formed. The control circuit is formed in a control circuit region 64 of the second surface 62. A control circuit is a circuit that amplifies output signals of the pressure sensor, a circuit that compensates sensitivity, a circuit that compensates offset, a circuit that compensates sensitivity and offset temperature characteristics, etc. Further, in the pressure sensor chip 11, a surge protection element, a filter (not depicted), etc. are formed. The pad member 65 is formed on the second surface 62 of the pressure sensor chip 11. Electrodes provided on the pad member 65 are each connected to lead pins (first terminal, third terminal) 15 by bonding wire 14. The electrodes provided on the pad member 65 are connected by, for example, metal wiring to control circuits formed in the control circuit region 64. In other words, the lead pins 15 are connected, via the bonding wire 14 and the electrodes provided on the pad member 65, to the control circuits formed in the control circuit region 64. Further, the pad member 65 and the control circuit region 64 are disposed in a portion of the second surface 62, exclusive of a region where the diaphragm 11a is provided. The pad member 65 may be disposed in a portion of the control circuit region 64.

The first surface 61 of the pressure sensor chip 11 is fixed to a bottom of the recess 10a of the case 10, via the base member 12. Although not particularly limited hereto, the base member 12 may be made of, for example, a glass material, i.e., Pyrex (registered trademark) glass, tempered glass, etc. The base member 12 and the pressure sensor chip 11 are joined by electrostatic bonding. The base member 12 and the case 10 are adhered by an adhesive (not depicted). The lead pin 15 is a terminal pin for leading out signals of the sensor element 1 and is provided in plural.

Each of the lead pins 15 passes through a different through-hole 10b of the case 10 to thereby penetrate the case 10 and is fixed to the case 10 by, for example, an insulating material 16, such as glass, that blocks the through-hole 10b. One end (hereinafter, lower end) of the lead pin 15 protrudes downward (toward the screw part 2) from the recess 10a of the case 10 and is connected by the bonding wire 14, to the electrodes provided on the pad member 65 on the second surface 62 of the pressure sensor chip 11. The other end (hereinafter, upper end) of the lead pin 15 protrudes upward (toward the socket housing part 4) from the side of the case 10, opposite the recess 10a side of the case 10. A recess 27 is provided on the side of the case 10, opposite the recess 10a side of the case 10. The recess 27 is provided to suppress stress from concentrating at the insulating material 16.

In particular, the lower ends of lead pins (hereinafter, first lead pins (first terminal)) 15a that among the lead pins 15, are a power supply terminal, a ground terminal and an output terminal, are each connected by the bonding wire 14 to the electrodes of the pressure sensor. The upper ends of the first lead pins 15a penetrate through-holes 3b of the inner housing part 3.

Meanwhile, the lower ends of lead pins (hereinafter, second lead pins (third terminal)) 15b that among the lead pins 15, are for property adjustment/trimming, are each connected by the bonding wire 14 to the electrodes of a predetermined control circuit. The second lead pins 15b are used to perform property adjustment/trimming during assembly of the physical quantity sensor device 100 and are not used after the property adjustment/trimming. Lengths of the first lead pins 15a and the second lead pins 15b are the same.

Here, a vertical direction is an axial direction of the lead pins 15 in the first embodiment. A horizontal direction is a direction orthogonal to the axial direction of the lead pins 15 in the first embodiment. The lead pins 15 are made of, for example, 42 Alloy, a metal such as an iron-nickel alloy (50 Ni—Fe) containing about 50 wt % of nickel (Ni) and iron (Fe) for the remaining percentage.

The screw part 2, for example, is made of a metal such as SUS. At a center of the screw part 2, a through-hole (intake hole) 23 through which a measured medium such as air as a gas subject to measurement, an oil as a liquid subject to measurement, etc. passes is provided in the vertical direction. An opening of a through-hole 23 at a first open end of the screw part 2 is a pressure inlet 24. The case 10 is placed on a base 21 provided at a second open end of the screw part 2, so that an opening 25 of the through-hole 23 at the second open end of the screw part 2 and the recess 10a of the case 10 face each other, and the diaphragm 13 is between the case 10 and the base 21. A vicinity of the location where the case 10, the diaphragm 13, and the base 21 of the screw part 2 are stacked on each other is joined by laser welding.

The diaphragm 13 is a thin wavy metal plate made of, for example, a metal such as SUS. The diaphragm 13 is disposed so as to block the opening of the recess 10a of the case 10 and the second open end of the screw part 2. A space surrounded by the recess 10a of the case 10 and the diaphragm 13 is filled with a liquid (pressure medium) 20 that transmits pressure to the pressure sensor chip 11, such as silicon oil. Reference numeral 22 of the vicinity of the location (junction) where the case 10, the diaphragm 13, and the base 21 of the screw part 2 are stacked on each other indicates the welded part of the case 10 and the base 21 of the screw part 2. Reference numeral 26 indicates an O-ring.

The inner housing part 3 is a resin member integrally formed with connector pins (external lead terminals and auxiliary terminal) 31, and has a substantially recessed shape that surrounds a vicinity of and a top of the sensor element 1. In particular, the inner housing part 3 is adhered by an adhesive 28, to an outer periphery of the case 10, on a side thereof opposite the recess 10a side of the case 10. The adhesive 28 is interposed between substantially the entire contact surfaces of the case 10 and the inner housing part 3. One of the contact surfaces of the inner housing part 3 and the case 10 may have a cross-sectional shape where recesses and protrusions are alternately arranged repeatedly (for example, jagged like a serrated blade) and the amount of adhesive on the contact surface may be increased to facilitate adhesion of the inner housing part 3 and the case 10. A recess 32 of the inner housing part 3 has a depth that enables housing of the second lead pins 15b.

The through-holes 3b through which the first lead pins 15a penetrate are provided in a portion 3a (hereinafter, a top 3a of the inner housing part 3) of the inner housing part 3 covering the sensor element 1. Further, at the top 3a of the inner housing part 3, the connector pins 31 are integrally formed. The connector pins 31 are signal terminals that communicate signals between the physical quantity sensor device 100 and an external device. A first end 31a of the connector pins 31 (refer to FIGS. 3A to 3D described hereinafter) has a through-hole 31e that is connected to the through-hole 3b of the inner housing part 3. In a recess 31f provided in a vertical part 31c (refer to FIGS. 3A to 3D described hereinafter) of the connector pins 31, a chip capacitor 18 is attached by a joining member 17. The chip capacitor 18 is attached between adjacent connector pins 31. A configuration of the connector pins 31 will be described with reference to FIGS. 2A and 2B.

During assembly, laser light is irradiated onto contacting parts of the upper end of the first lead pins 15a and the first end 31a of the connector pins 31 (parts to be joined). The laser light is irradiated from the top, at a predetermined angle of incidence (about a 3-degree incline angle with respect to the vertical direction). The upper ends of the first lead pins 15a are joined to the first ends 31a of the connector pins 31 by this laser welding. The connector pins 31 are made of, for example, a metal such as phosphor bronze (an alloy of copper (Cu) containing tin (Sn)), 42 alloy, 50 Ni—Fe, etc. The connector pins 31 and the lead pins 15 are joined by the irradiation of laser light so as to be welded to each other.

Since the first lead pins 15a and the connector pins 31 may be connected electrically, instead of the described laser welding, the first lead pins 15a and the connector pins 31 may be joined by solder. Further, configuration may be such that the first lead pins 15a and the connector pins 31 exposed in the through-holes 3b simply contact each other. In this case, the through-holes 31e need not be provided in the connector pins 31. An instance of this configuration is described in a third embodiment hereinafter. Additionally, elastic members such as springs may be disposed on the first lead pins 15a.

The socket housing part 4 is a connection part that is connected to external wiring and in which the vertical parts 31c (refer to FIGS. 3A to 3D described hereinafter) of the connector pins 31 are housed, the portions of the vertical parts 31c extending from the inner housing part 3 being connector parts 31s configured to be connected to external wiring. The socket housing part 4 has, for example, a substantially cylindrical shape that surrounds a periphery of the vertical parts 31c of the connector pins 31. For example, the connector pins 31 penetrate through-holes 4c in a bottom 4b of the socket housing part 4 and protrude into a space 41 surrounded by the socket housing part 4. The socket housing part 4 is adhered by an adhesive (not depicted), to an outer periphery on the top 3a of the inner housing part 3. The adhesive is interposed between substantially the entire contact surfaces of the inner housing part 3 and the socket housing part 4. A recess 3d and a protrusion 4a that fit into each other may be provided at joining aspects of the socket housing part 4 and the inner housing part 3.

Maximal diameters of the socket housing part 4, the inner housing part 3, the case 10, and the base 21 of the screw part 2 may be substantially equal. The reason for this is as follows. As described, the screw part 2, the case 10, the inner housing part 3, and the socket housing part 4 are sequentially overlapped and joined (or bonded). Therefore, by configuring the maximal diameters of the base 21 of the screw part 2, the case 10, the inner housing part 3, and the socket housing part 4 to be substantially equal, size reductions along the diameter direction (the horizontal direction) may be facilitated.

Figure 3A:
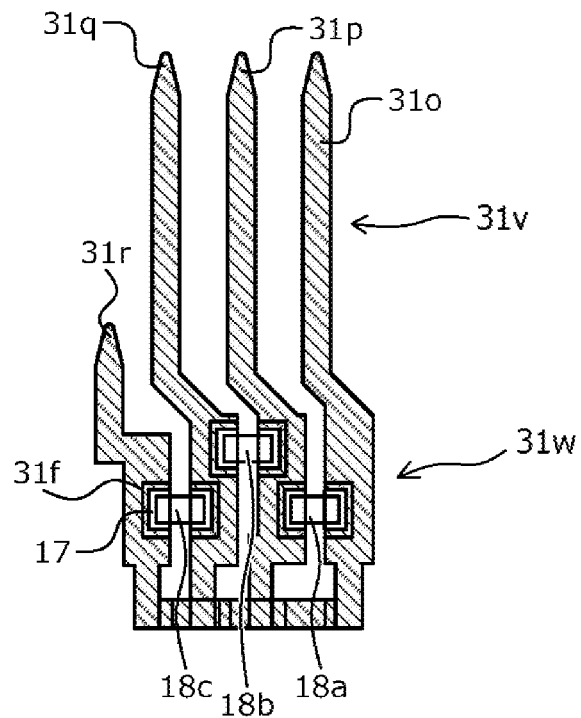
FIGS. 3A, 3B, 3C, 3D, 4, 5A, 5B, 6, 7, 8, 9, 10, 11, 12A, 12B, 13, 14, 15A, 15B, and 16 are diagrams depicting states of the physical quantity sensor device according to the first embodiment during manufacture (assembly)

In the physical quantity sensor device 100 of the described configuration, a pressure medium is introduced from the pressure inlet 24 and when the diaphragm 11a of the pressure sensor chip 11 is subjected to pressure, the diaphragm 11a deforms, gauge resistor values on the diaphragm 11a vary, and a corresponding voltage signal is generated. The voltage signal is amplified by an amplifier circuit adjusted by an adjustment circuit such as a sensitivity compensating circuit, offset compensating circuit, temperature characteristics compensating circuit, etc., and the amplified voltage signal is output from the pressure sensor chip 11. The output signal is output via the bonding wire 14 to the first lead pins 15a. As depicted in FIG. 3A, the first to fourth connector pins 31o, 31p, 31q, and 31r may include first and second axially-extending portions 31v and 31w. The first axially-extending portion 31v may correspond to the connector portion 31s for physically and electrically connecting to external wiring, and the second axially-extending portion 31w may be a portion in which the capacitors 18a, 18b, and 18c are connected between the respective first to fourth connector pins 31o, 31p, 31q, and 31r.

Next, a method of manufacturing (method of assembling) the physical quantity sensor device 100 will be described. FIGS. 3A, 3B, 3C, 3D, 4, 5A, 5B, 6, 7, 8, 9, 10, 11, 12A, 12B, 13, 14, 15A, 15B, and 16 are diagrams depicting states of the physical quantity sensor device according to the first embodiment during manufacture (assembly).

First, the inner housing part 3 and the connector pins 31 to which the chip capacitors 18 are connected will be described with reference to FIGS. 3A to 5B. FIGS. 3A to 3D depict only the connector pins 31 and the chip capacitors 18 without the inner housing part 3.

Figure 3B:
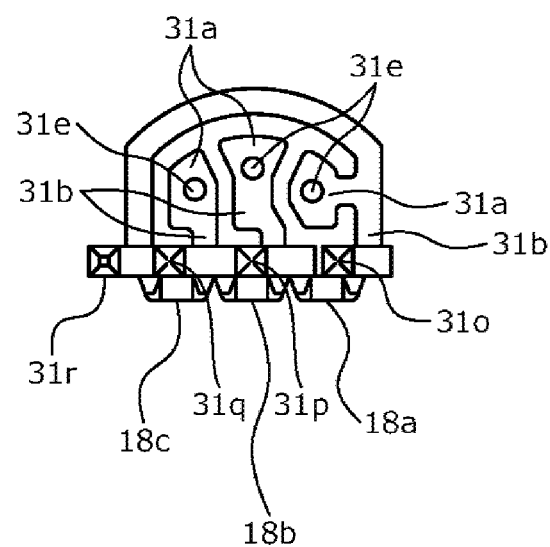
Figure 3C:
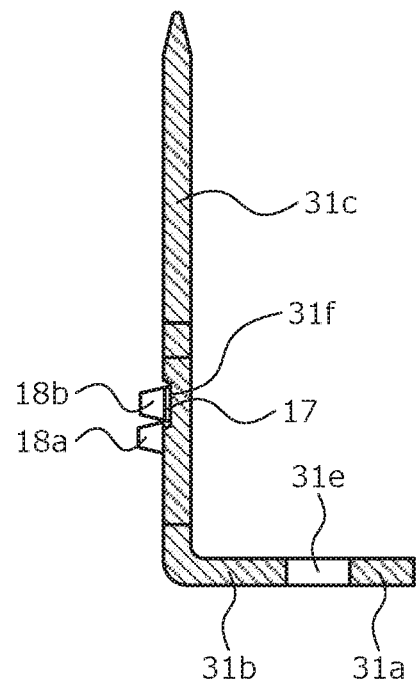
Figure 3D:
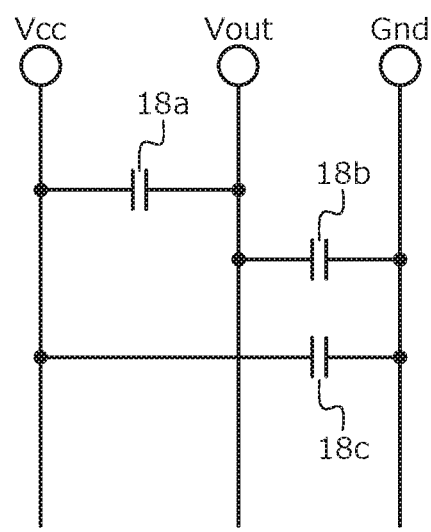

In FIGS. 3A to 3C, the connector pins 31 are depicted as viewed from various directions. FIG. 3D depicts an equivalent circuit of the chip capacitors 18 that connect the connector pins 31 to each other. A first connector pin 31o (external lead terminal) and a fourth connector pin 31r (auxiliary terminal) are signal terminal pins that supply a power-supply signal for supplying power-supply voltage, and are connected to a lead pin 15 that is a power supply terminal. A second connector pin 31p (external lead terminal) is a signal terminal pin for leading out a sensor signal, and is connected to a lead pin 15 that is an output terminal. A third connector pin 31q (external lead terminal) is a signal terminal pin for connecting to a ground (Gnd), and is connected to a lead pin 15 that is a ground terminal. The first connector pin 31o to the fourth connector pin 31r are arranged in a line. As a result, installation of the chip capacitors 18 is facilitated.

Further, to install the chip capacitor 18 respectively between a signal terminal pin for supplying the power-supply signal (Vcc), the signal terminal pin for leading out the sensor signal (Vout), and the signal terminal pin for connecting to the ground (Gnd), two signal terminal pins for supplying the power-supply signal (Vcc) are provided on both sides like the first connector pin 31o and the fourth connector pin 31r.

The first connector pin 31o to the third connector pin 31q have a substantially L-shaped cross-sectional shape formed by a part (hereinafter, horizontal part (first part)) 31b embedded in the top 3a of the inner housing part 3 by resin molding and a part (hereinafter, vertical part (second part)) 31c continuous with and protruding upwardly orthogonal to the horizontal part 31b (the first connector pin 31o is shown in the example depicted in FIG. 3C). The fourth connector pin 31r has a substantially I-shaped cross-sectional shape having only the vertical part 31c (not depicted).

The first ends 31a of the first connector pin 31o to the third connector pin 31q are formed so as to surround the peripheries of the through-holes 31e (FIG. 3B). The first ends 31a of the first connector pin 31o to the third connector pin 31q may be formed in substantially semicircular planar shapes surrounding a portion of the peripheries of the through-holes 31e, or may have linear planar shapes reaching side walls of the through-holes 31e so as to be exposed at a part of the side walls of the through-holes 31e (not depicted).

The horizontal part 31b of the first connector pin 31o is provided so as to surround the first end 31a of the first connector pin 31o, the horizontal part 31b and the first end 31a of the second connector pin 31p, and the horizontal part 31b and the first end 31a of the third connector pin 31q, and is integrated with and connected to the fourth connector pin 31r (FIG. 3B). Thus, the first connector pin 31o and the fourth connector pin 31r have the same potential.

First, the chip capacitors 18 are attached to the connector pins 31 by the joining member 17, which is solder, a conductive adhesive, or the like. For example, the first connector pin 31o and the second connector pin 31p are connected via the chip capacitor 18a (FIGS. 3A and 3B). For example, the second connector pin 31p and the third connector pin 31q are connected via the chip capacitor 18b (FIGS. 3A and 3B). For example, the third connector pin 31q and the fourth connector pin 31r are connected via the chip capacitor 18c (FIGS. 3A and 3B). In this manner, the connector pins 31 are connected to each via the chip capacitors 18 (FIGS. 3A and 3B). As described, the first end 31a of the first connector pin 31o is connected to the vertical part 31c of the fourth connector pin 31r thereby enabling the chip capacitors 18 to be installed between the terminals (FIG. 3D).

In the example depicted in FIGS. 3A to 3D, although the chip capacitors 18 are installed between the terminals, configuration is not limited hereto. For example, whether a chip capacitor 18c between the fourth connector pin 31r and the third connector pin 31q is to be installed may be determined according to surge demands. For example, when the chip capacitor 18c is to be installed, electromagnetic compatibility (EMC) capability improves as compared to a case where the chip capacitor 18c is not installed. In this manner, the chip capacitors 18 may be installed without providing a noise suppressing substrate, enabling costs related to the noise suppressing substrate to be saved.

Next, the connector pins 31 are placed in a mold for molding the inner housing part 3. Subsequently, a resin material is flowed into the mold whereby the inner housing part 3 and the connector pins 31 are integrally formed (insert molding).

Figure 4:
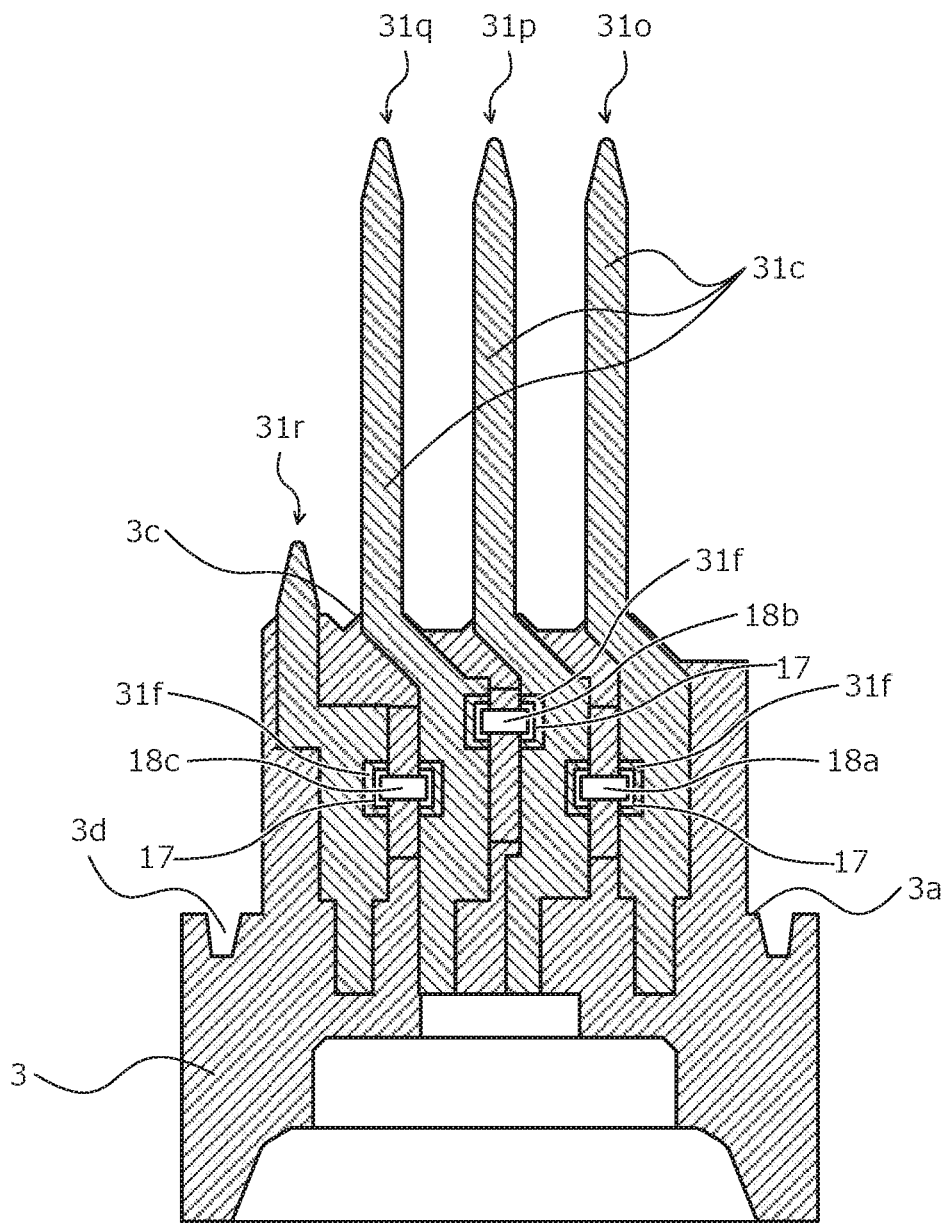
Figure 5A:
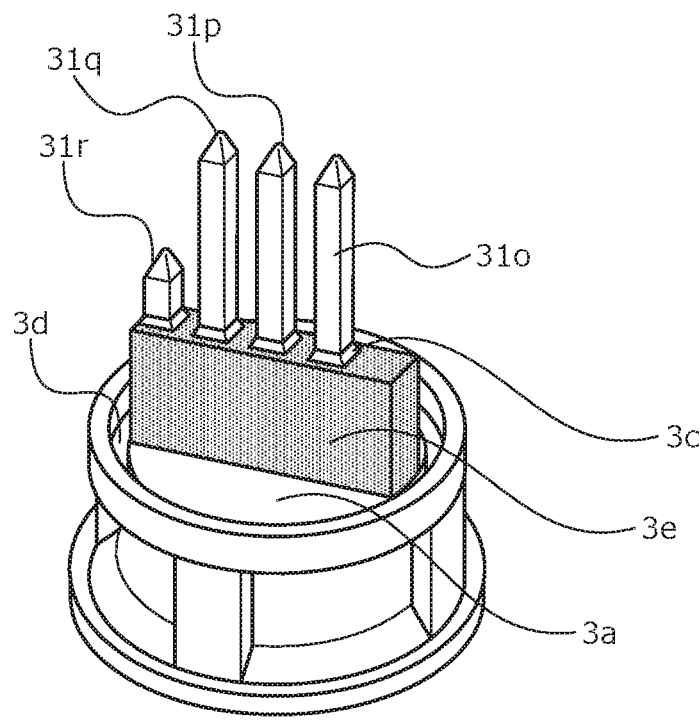
Figure 5B:
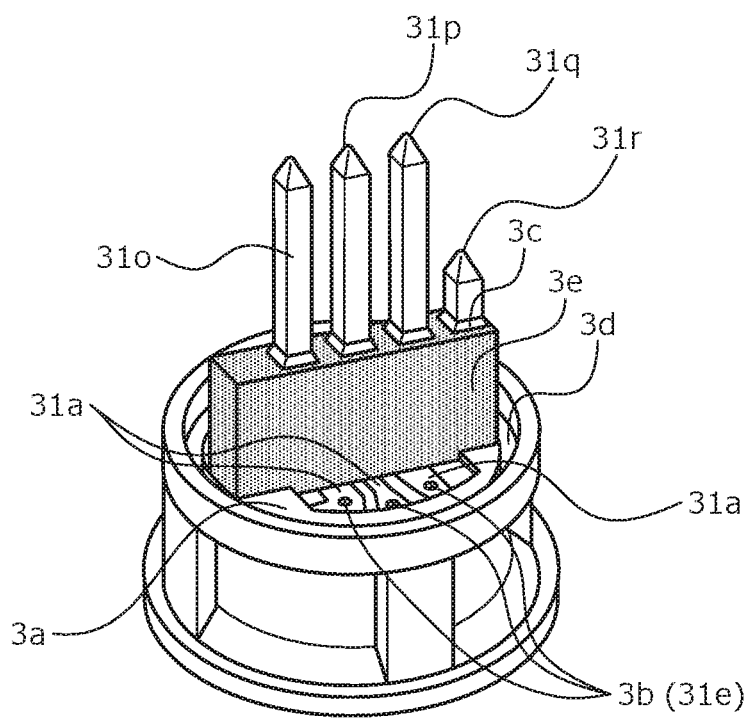

FIG. 4 is a cross-sectional view of the inner housing part 3. FIGS. 5A and 5B are exterior views of the inner housing part. The recess 3d that is fitted with the joining aspect that is joined with the socket housing part 4 is provided in the inner housing part 3 (FIG. 4, FIG. 5A, FIG. 5B).

Figure 12A:
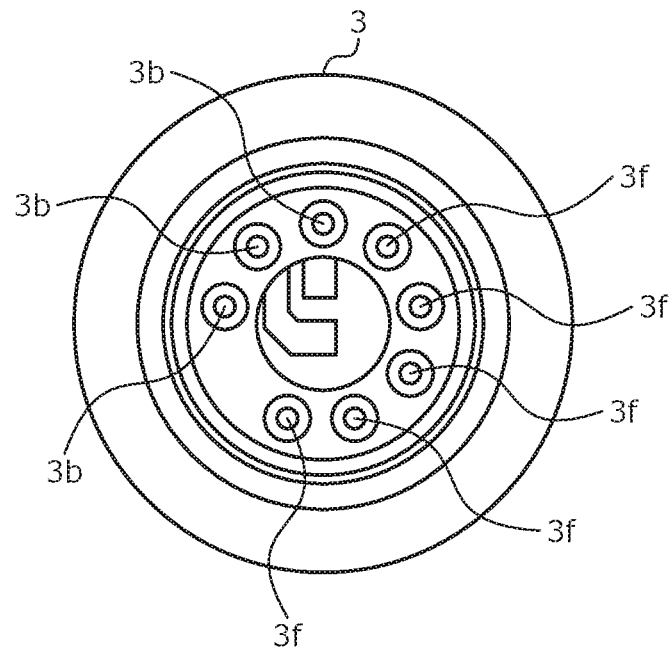
Figure 12B:
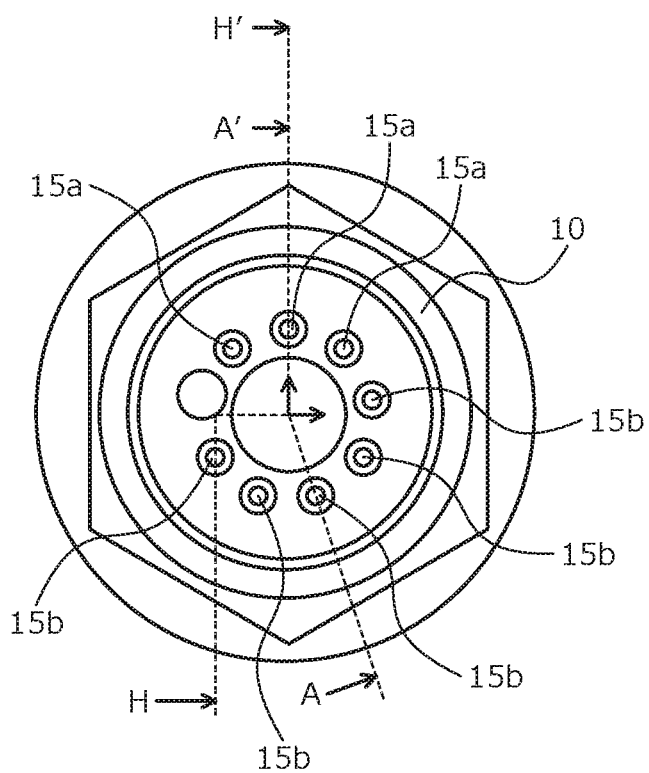

In the top 3a of the inner housing part 3, the through-holes 3b through which the first lead pins 15a penetrate are provided (FIG. 5B). The through-holes 3b are provided at the same positions as the positions of the through-holes 31e of the connector pins 31 (refer to FIGS. 3A to 3D). Therefore, the through-holes 3b of the surface seen from the side where the connector pins 31 of the inner housing part 3 are exposed are the same as the through-holes 31e. However, as depicted in FIGS. 12A and 12B described hereinafter, the through-holes 3b of the surface seen from the side where the connector pins 31 of the inner housing part 3 are exposed are through-holes formed by resin. Further, in the top 3a of the inner housing part 3, the connector pins 31 are integrally formed (FIG. 4, FIG. 5A, FIG. 5B). For example, a portion of the vertical part 31c of the connector pins 31 is exposed from the inner housing part 3 (FIG. 4). For example, the top 3a of the inner housing part 3 covers the horizontal part 31b of the connector pins 31. The first end 31a of the connector pins 31 is exposed from the top 3a of the inner housing part 3. These exposed portions of the first end 31a of the connector pins 31 and the first lead pins 15a are welded to each other.

Further, an upper end 3e of the inner housing part 3 covers the chip capacitors 18 attached to the connector pins 31 and the joining members 17.

Processes from a process of attaching the lead pins to the case 10 to a process of injecting the pressure medium and sealing will be described with reference to FIGS. 6 to 11.

Figure 6:
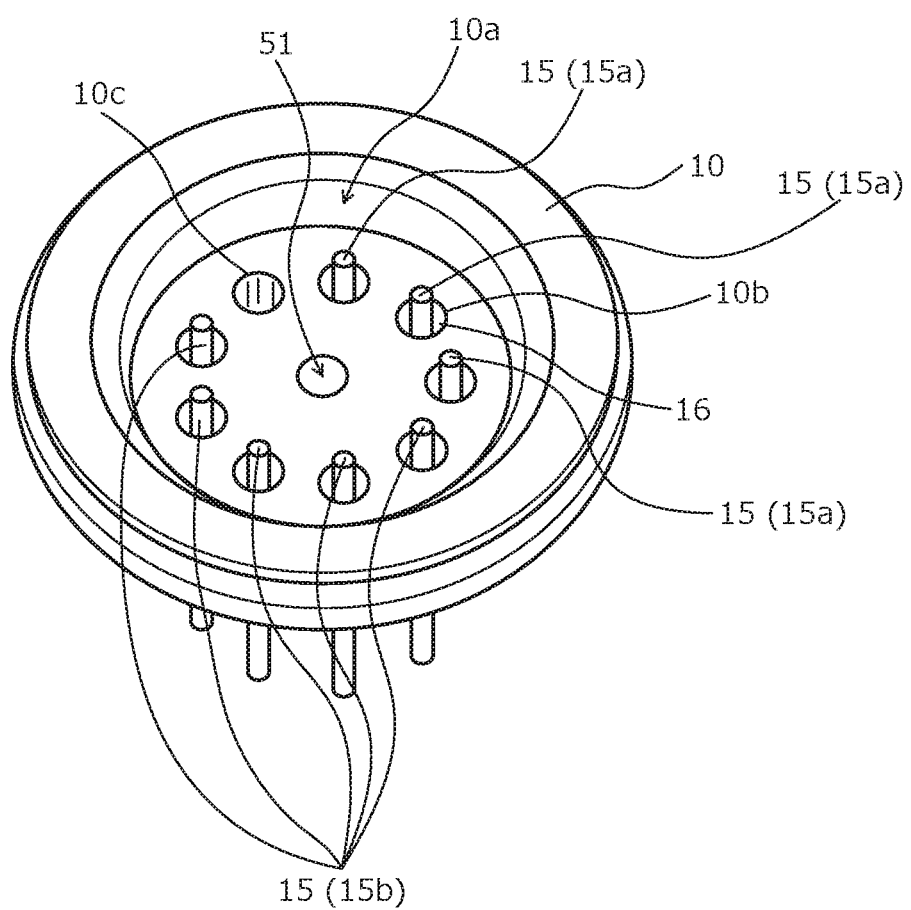

As depicted in FIG. 6, the lead pins 15 are placed in the through-holes 10b of the case 10. Here, an example will be described where the case 10 has a substantially circular planar shape and the through-holes 10b are provided along a circle centered about a center of the bottom of the recess 10a of the case 10. Among plural holes, one hole is a hole 10c for injecting an oil that is the pressure medium and the remaining holes are the through-holes 10b through which the lead pins 15 penetrate.

Figure 7:
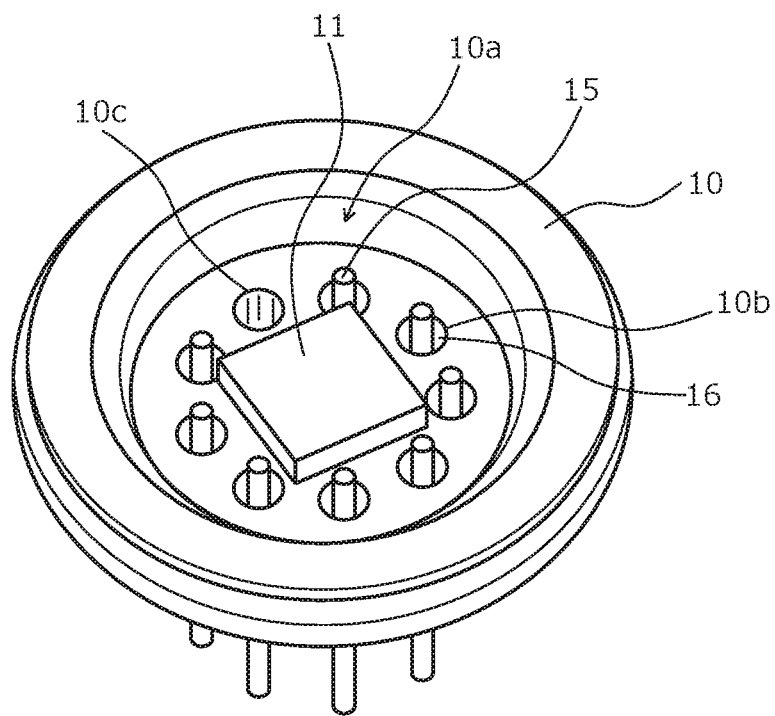
Figure 8:
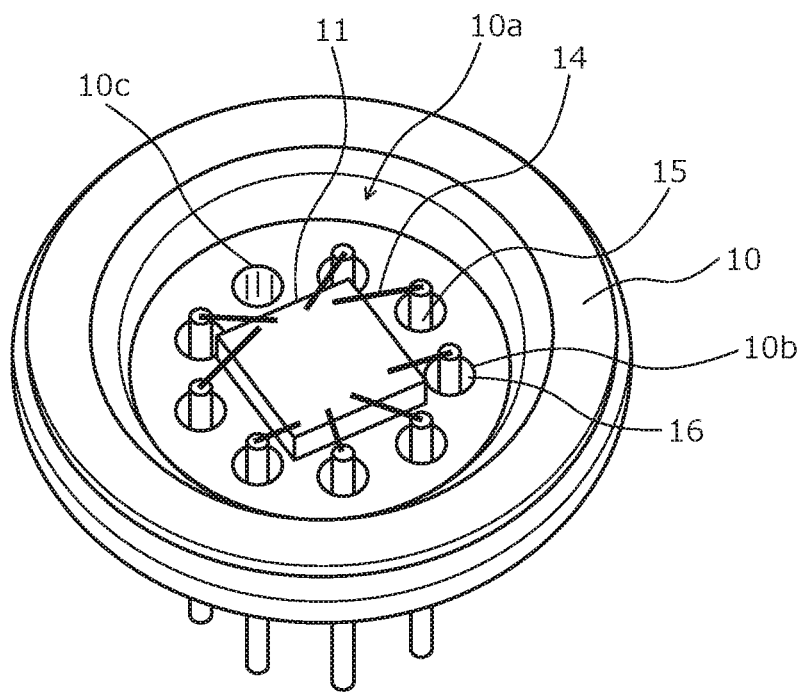
Figure 9:
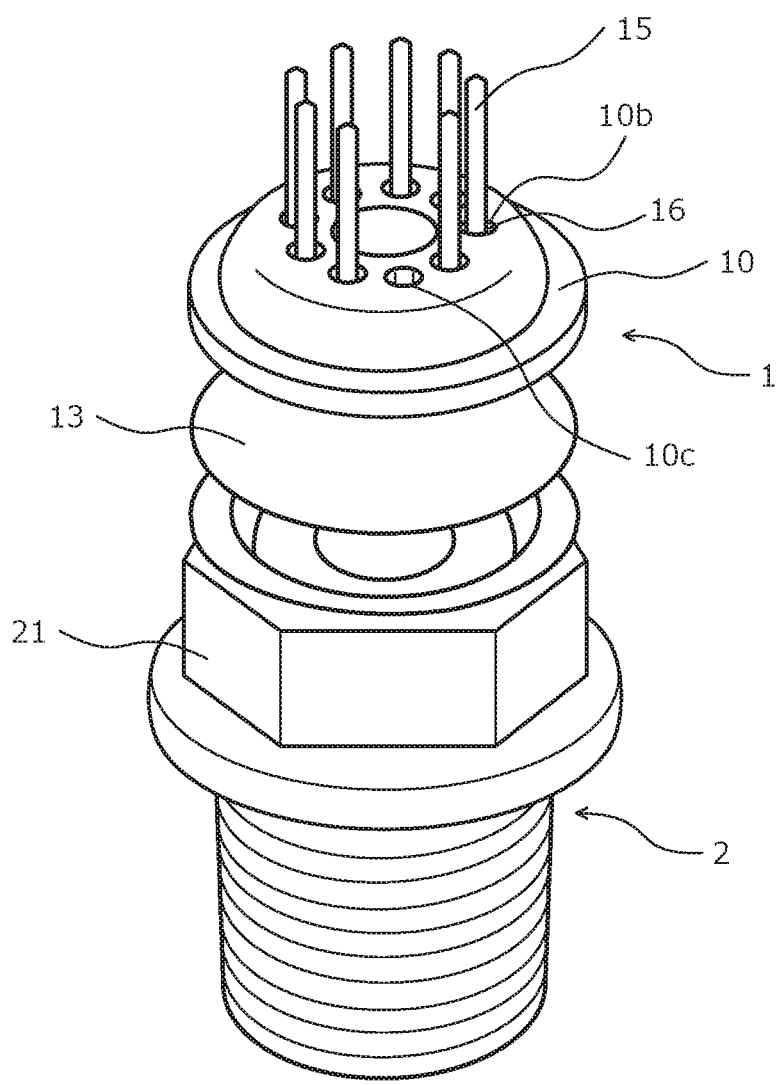

Next, the insulating material 16, which is glass or the like, is flowed into the through-holes 10b of the case 10, thereby joining (hermetic sealing) the lead pins 15 and the case 10. Next, an adhesive 51 is applied to the bottom of the recess 10a of the case 10, for example, at a center thereof where the through-holes 10b are not provided. Next, as depicted in FIG. 7, the pressure sensor chip 11 is placed on and mounted by the adhesive 51 of the bottom of the recess 10a of the case 10. Next, as depicted in FIG. 8, the lead pins 15 and the electrodes of the pressure sensor chip 11 are electrically connected by the bonding wire 14. Next, as depicted in FIG. 9, the case 10 is placed on the base 21 of the screw part 2 so that the diaphragm 13 is therebetween and the recess 10a side of the case 10 is downward (the screw part 2 side), and overlapping portions of these members, for example, are joined by laser welding.

Figure 10:
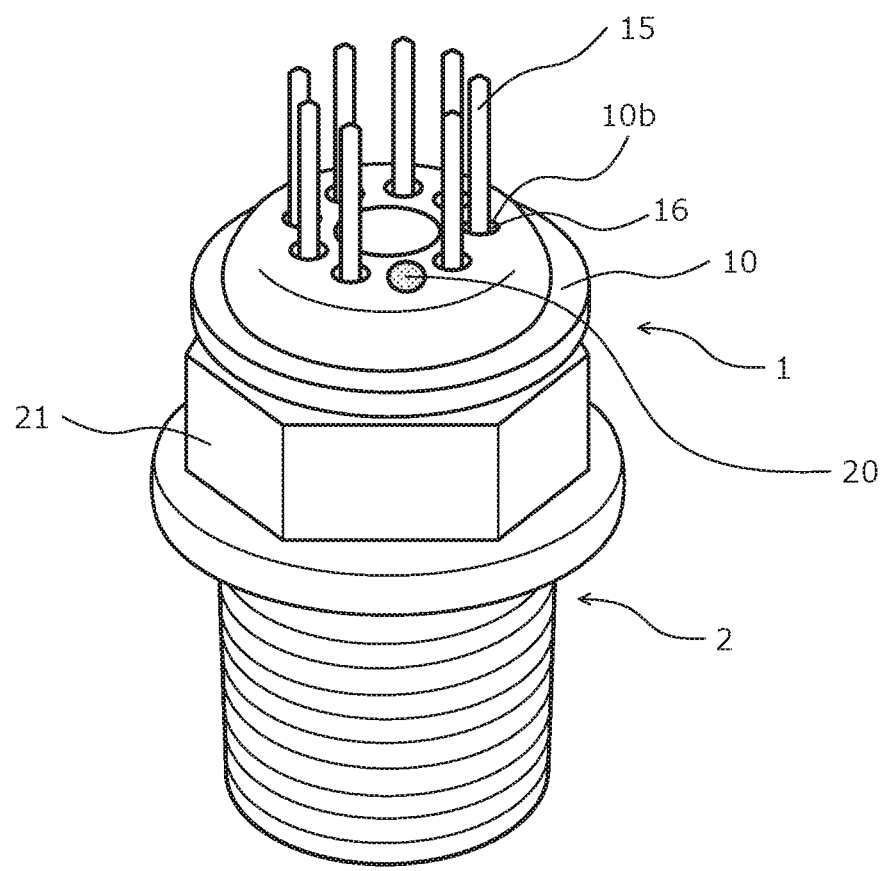
Figure 11:
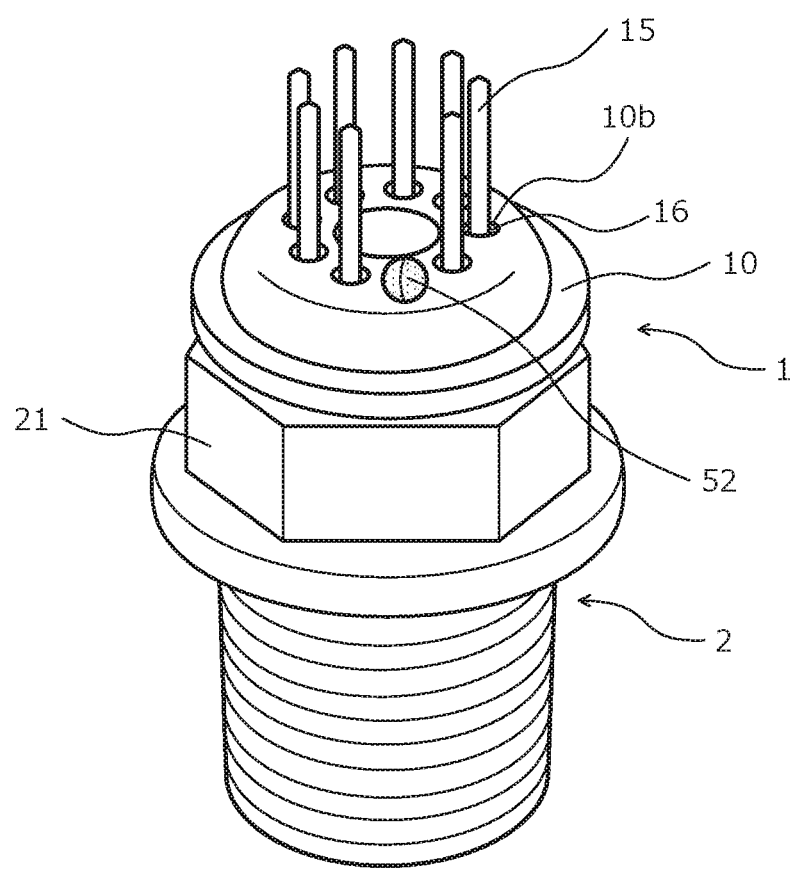

Next, as depicted in FIG. 10, in a vacuum atmosphere, a liquid 20 such as silicon oil is injected from the hole 10c of the case 10 into the space surrounded by the recess 10a of the case 10 and the diaphragm 13. Next, as depicted in FIG. 11, for example, a metal ball 52 made of a metal such as SUS is pressed into the hole 10c through which the liquid 20 was injected, and voltage is applied. As a result, the metal ball 52 is welded (resistance welded) in the opening of the hole 10c whereby the liquid 20 is sealed in. Next, by an ordinary method, property adjustment/trimming for the sensor element 1 is performed.

A process of adhering the inner housing part 3 and the case 10 will be described with reference to FIGS. 12A to 14.

FIG. 12A depicts the bottom of the inner housing part 3, on the side where the connector pins 31 are not exposed and FIG. 12B depicts an aspect where the lead pins 15 of the case 10 are exposed.

In the example depicted in FIG. 12A, the inner housing part 3 has three through-holes 3b and five grooves 3f. The through-holes 3b, as described above, are connected to the connector pins 31. The first lead pins 15a penetrate the through-holes 3b and are connected to the connector pins 31. The second lead pins 15b are inserted in the grooves 3f. When a length of the lead pins 15 is about 8 mm, the insertion length of the grooves 3f and the second lead pins 15b is about 2 mm to 3 mm. The shape of the grooves 3f corresponding to a portion the second lead pins 15b of may be a shape that enables fitting of the second lead pins 15b and the second lead pins 15b may be fitted into the grooves 3f.

Since the cross-sectional shape of the lead pins 15 in the horizontal direction (cross-section resembling round slices of the lead pins 15) is a circular shape, the shapes of the through-holes 3b and the grooves 3f are circular.

Figure 13:
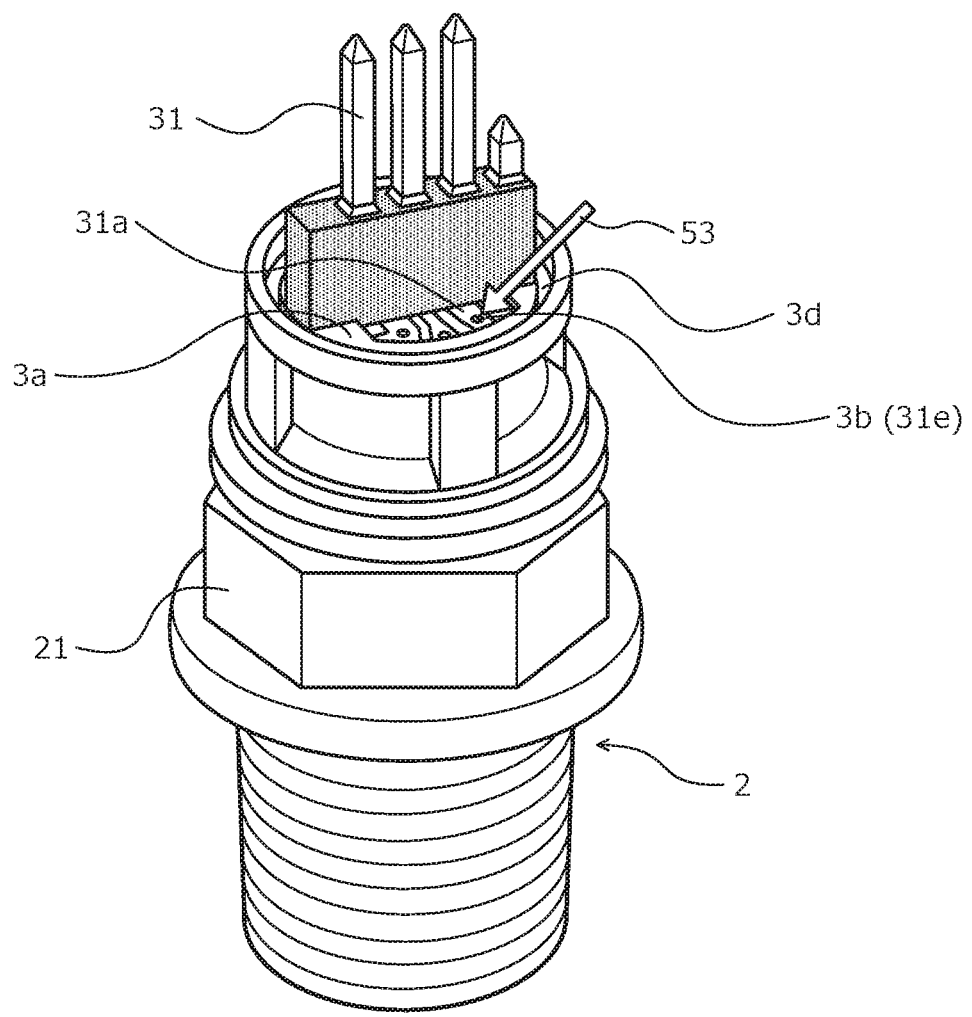

Next, as depicted in FIG. 13, the first lead pins 15a penetrate the through-holes 3b of the inner housing part 3 integrally formed with the connector pins 31 and the second lead pins 15b are inserted into the grooves 3f of the inner housing part 3 whereby the position of the inner housing part 3 is determined, and the inner housing part 3 is fixed to the case 10 by the adhesive 28 that has been cured (FIG. 1). For example, the inner housing part 3 and the case 10 are allowed to stand in a high temperature state until the applied adhesive 28 is cured. Here, to prevent lifting of the inner housing part 3 during curing of the adhesive 28, the inner housing part 3 and the case 10 may be pressed down.

At this time, the first lead pins 15a are in contact with the connector pins 31 exposed on the top 3a of the inner housing part 3 by the through-holes 3b of the inner housing part 3. Further, at this step, the socket housing part 4 that covers the periphery of the connector pins 31 is not joined, and on the inner housing part 3, no members forming obstacles on an approach path of laser light 53 are arranged. In other words, contacting parts of the upper end of the first lead pins 15a and the first end 31a of the connector pins 31 are visible from substantially above. Next, the laser light 53 is irradiated at a predetermined angle of incidence in the through-holes 3b of the inner housing part 3 whereby contacting parts of the upper ends of the first lead pins 15a and the first ends 31a of the connector pins 31 are welded (joined).

Figure 14:
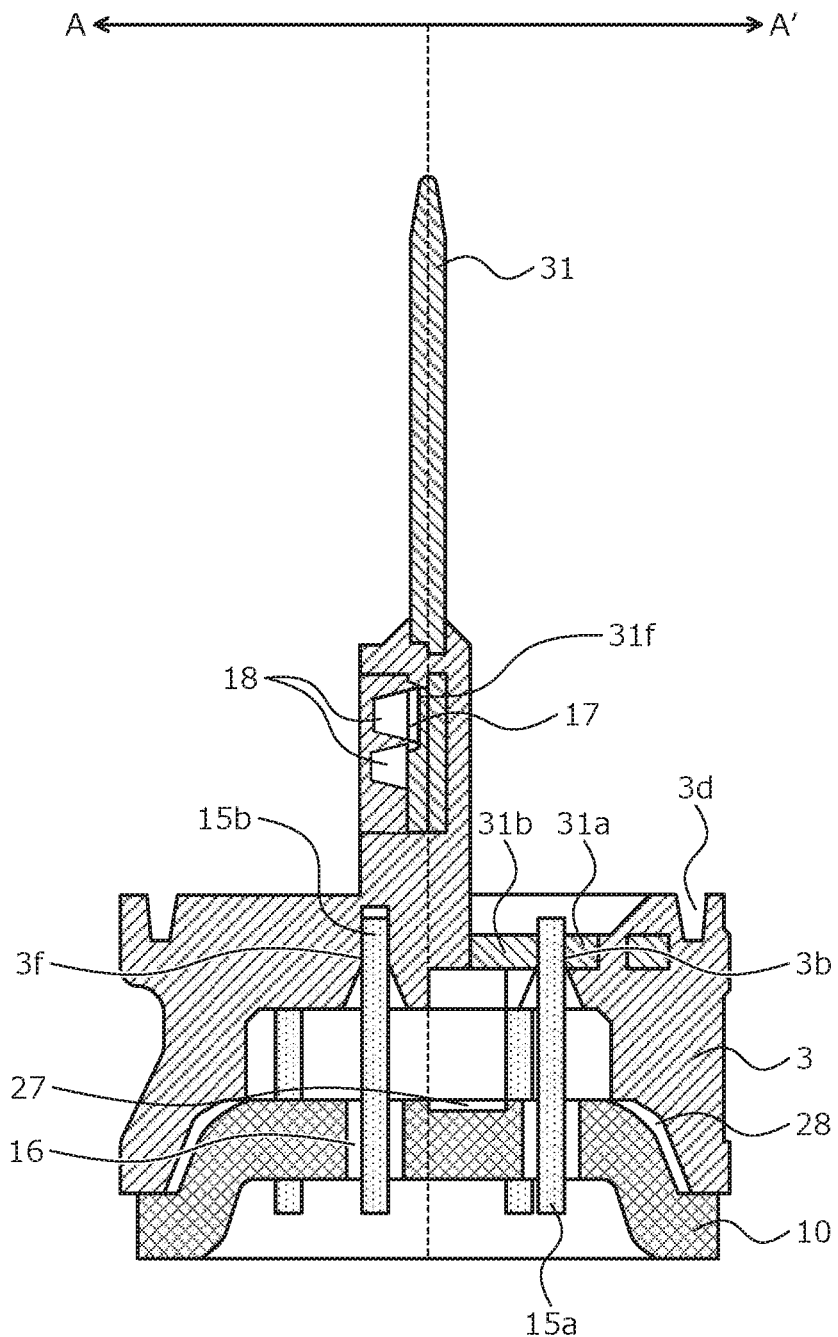

FIG. 14 is a cross-sectional view of the fixed inner housing part 3 and the case 10, at a position of a cross-section A-A' depicted in FIG. 12B. In FIG. 14, the screw part 2 and the pressure sensor chip 11 are not depicted. The first lead pins 15a are welded to the connector pins 31. In particular, for example, the upper ends of the first lead pins 15a penetrate the through-holes 3b, and are joined to the first ends 31a of the connector pins 31 and the horizontal parts 31b of the connector pins 31. Meanwhile, the second lead pins 15b are inserted into the grooves 3f. Further, since the second lead pins 15b are not cut, the second lead pins 15b and the first lead pins 15a are the same length.

The socket housing part 4 will be described with reference to FIGS. 15A and 15B.

Figure 15A:
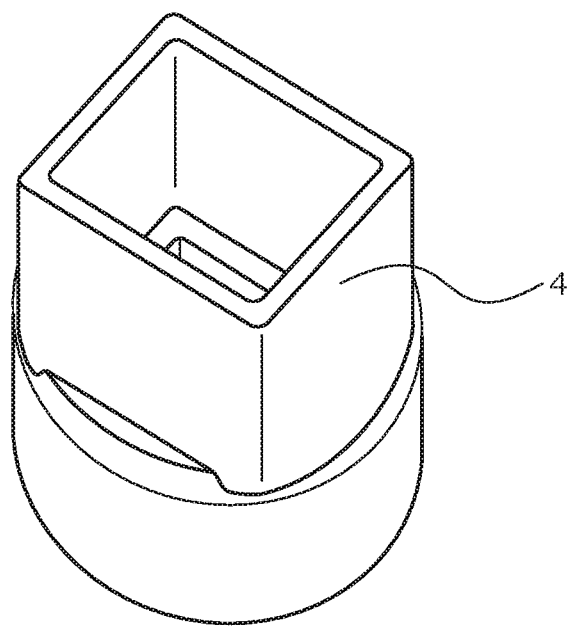
Figure 15B:
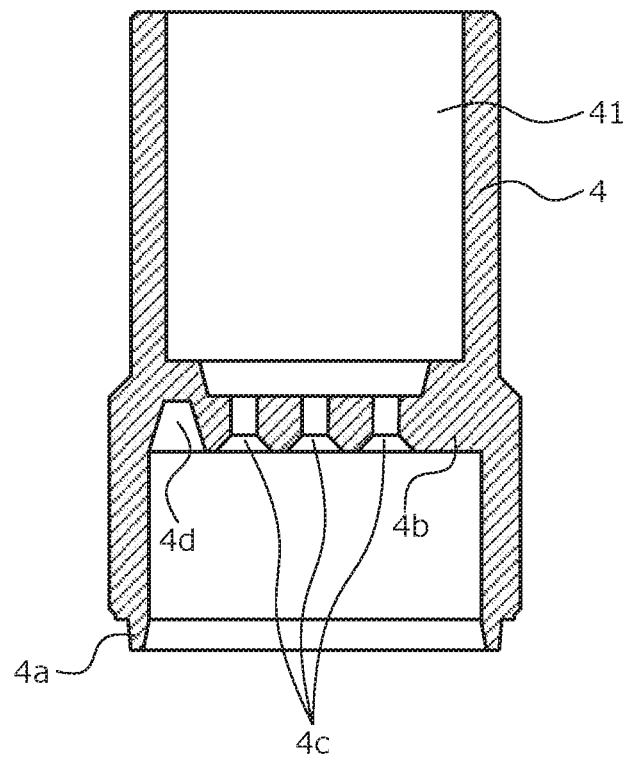

FIG. 15A is a perspective drawing of the socket housing part 4. FIG. 15B is a cross-sectional view of the socket housing part 4. The socket housing part 4 houses the vertical part 31c of the connector pins 31. The socket housing part 4, at an aspect joined with the inner housing part 3, is provided with the protrusion 4a that is fitted with the recess 3d of the inner housing part 3.

Further, the inside of the socket housing part 4 is a recess. At the bottom 4b of the recess of the socket housing part 4, the through-holes 4c and a groove 4d are provided. At the bottom 4b, the groove 4d is provided at a portion near an inner wall of the socket housing part 4 whereby a thickness of a part where the groove 4d of the bottom 4b is provided is thicker than the through-holes 4c. The first connector pin 31o to the third connector pin 31q penetrate the through-holes 4c. The fourth connector pin 31r is inserted into the groove 4d. Further, the through-holes 4c and the groove 4d, including a bottom 3c of the inner housing part 3, have a shape that enables the connector pins 31 to penetrate or be inserted. The position of the inner housing part 3 may be determined by the position of the groove 4d and the through-holes 4c.

A process of joining the socket housing part 4 and the inner housing part 3 will be described with reference to FIG. 16.

Figure 16:
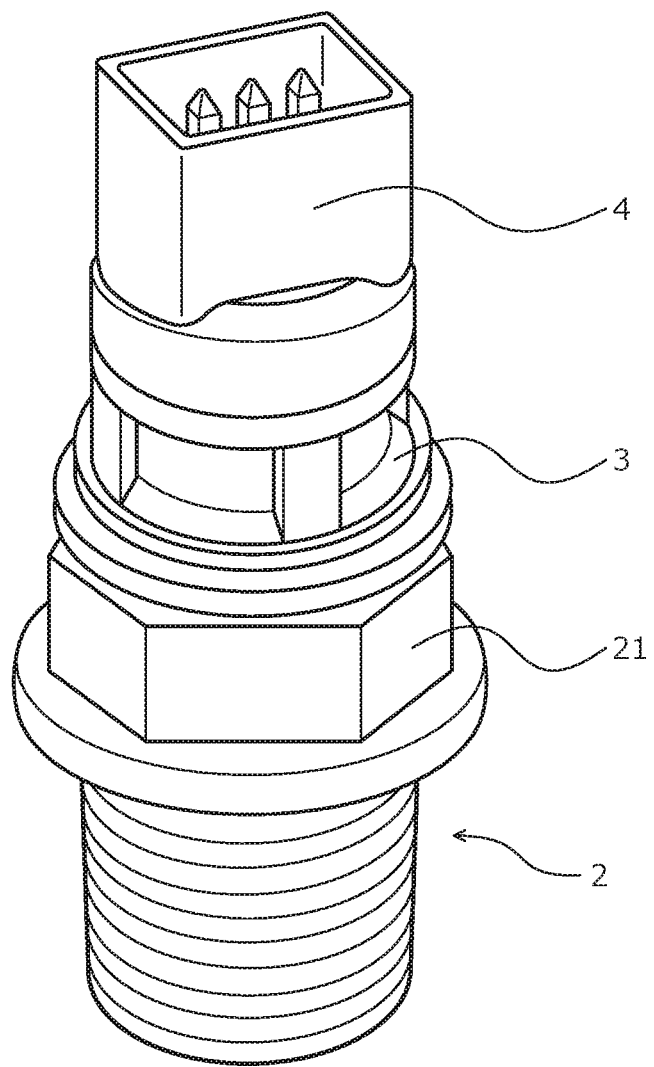

As depicted in FIG. 16, the socket housing part 4 and the inner housing part 3 are joined by an adhesive. As a result, the socket housing part 4 is joined on the top 3a of the inner housing part 3 so as to surround a periphery of the connector pins 31. At this time, for example, the first connector pin 31o to the third connector pin 31q penetrate the through-holes 4c. The fourth connector pin 31r is inserted into the groove 4d and the first connector pin 31o to the third connector pin 31q penetrate the through-holes 4c whereby the inner housing part 3 and the socket housing part 4 are joined to each other.

Thereafter, an O-ring 26 is disposed beneath the base 21 of the screw part 2 (FIG. 1) whereby the physical quantity sensor device 100 depicted in FIG. 1 is completed.

Figure 17:
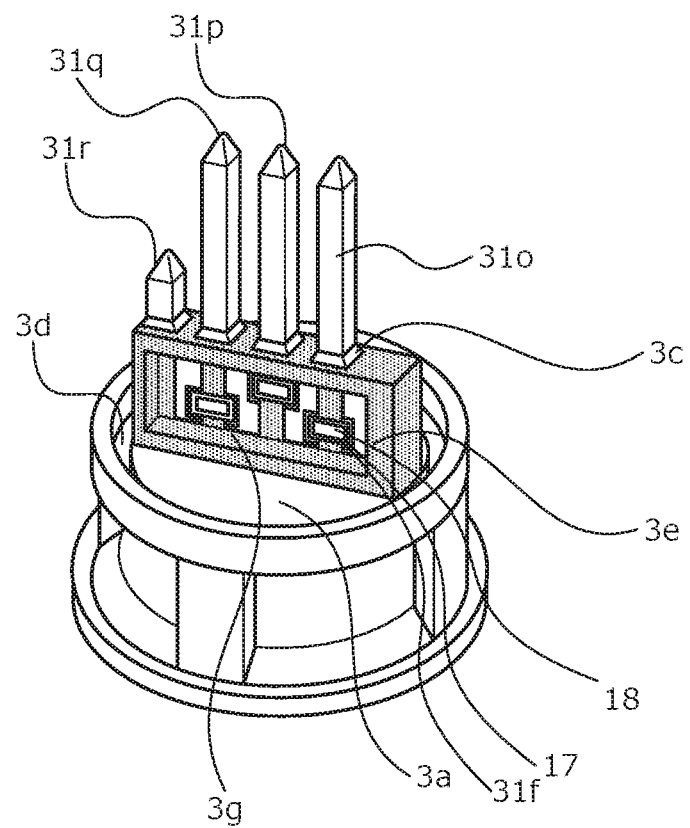
FIG. 17 is a diagram depicting the physical quantity sensor device during manufacture (assembly) according to a second embodiment.

The method of manufacturing a physical quantity sensor device according to the second embodiment will be described. FIG. 17 is a diagram depicting the physical quantity sensor device during manufacture (assembly) according to the second embodiment. The method of manufacturing a physical quantity sensor device according to the second embodiment differs from the method of manufacturing a physical quantity sensor device according to the first embodiment in that the inner housing part 3 and the connector pins 31 are integrally formed so as to form a window 3g exposing a portion of the connector pins 31 for attaching the chip capacitors 18 and after the chip capacitors 18 are attached to the connector pins 31 exposed in the window 3g of the inner housing part 3, the window 3g is filled with a resin.

In particular, the connector pins 31 are placed in a mold for forming the inner housing part 3. Subsequently, a resin material is flowed into the mold whereby the inner housing part 3 and the connector pins 31 are integrally formed. Thus, as depicted in FIG. 17, the upper end 3e of the inner housing part 3 where the window 3g is provided is formed. Next, as depicted in FIG. 17, the chip capacitors 18 are attached by the joining members 17 to the recesses 31f of the connector pins 31 exposed in the window 3g. Next, resin material is flowed into the window 3g whereby the window 3g is filled with a resin. As a result, as depicted in FIG. 5A described above, the inner housing part 3 in which the joining member 17 and the chip capacitor 18 attached to the connector pins 31 are covered by a resin is obtained.

The process of integrally forming the inner housing part 3 and the connector pins 31, the process of attaching the chip capacitors 18 to the connector pins 31, and the process of filling the window 3g with a resin in the method of manufacturing a physical quantity sensor device according to the second embodiment are performed in place of the process for attaching the chip capacitors 18 to the connector pins 31 and integrally forming the inner housing part 3 and the connector pins 31 after attaching the chip capacitors 18 in the method of manufacturing a physical quantity sensor device according to the first embodiment. Further, in the method of manufacturing a physical quantity sensor device according to the second embodiment, processes other than these processes are similar to those in the method of manufacturing a physical quantity sensor device according to the first embodiment and therefore, detailed description is omitted hereinafter.

Figure 18:
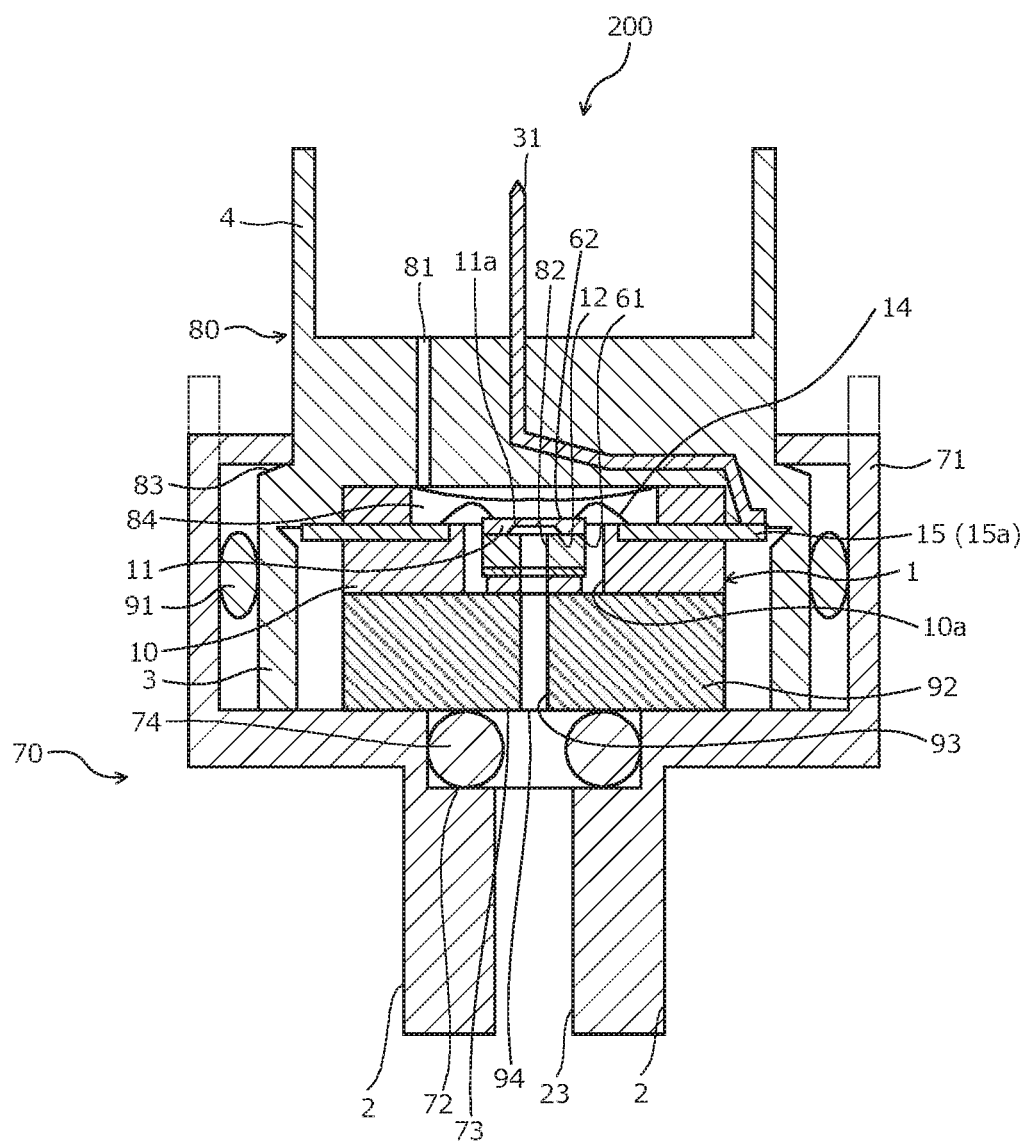
FIGS. 18 and 19 are cross-sectional views of the configuration of the physical quantity sensor device according to a third embodiment.
Figure 19:
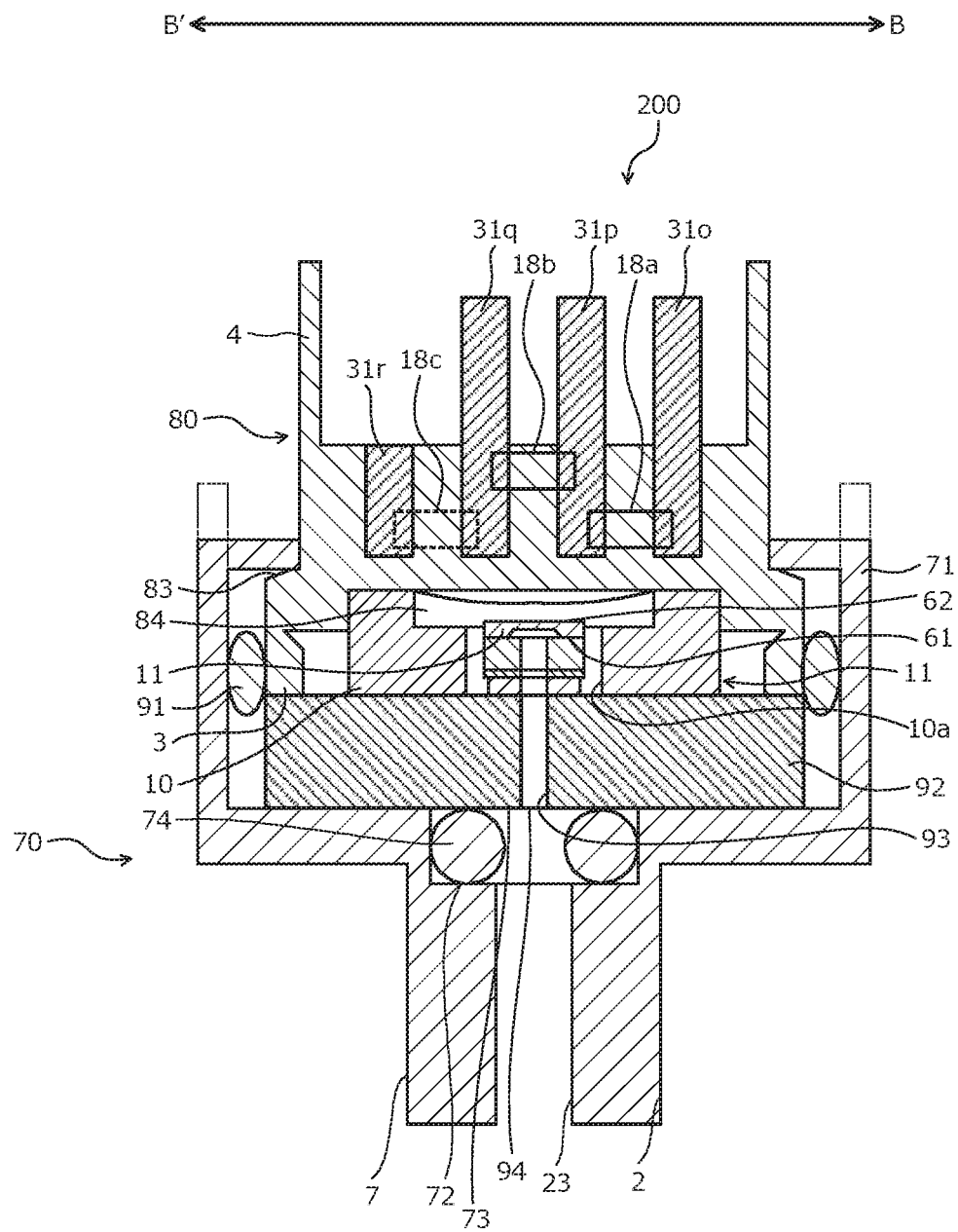
Figure 20A:
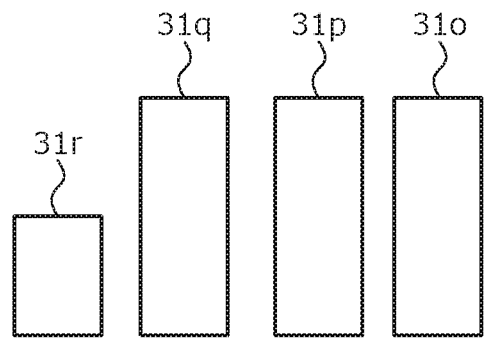
FIGS. 20A, 20B, and 20C are diagrams of the configuration of connector pins depicted in FIGS. 18 and 19.
Figure 20B:
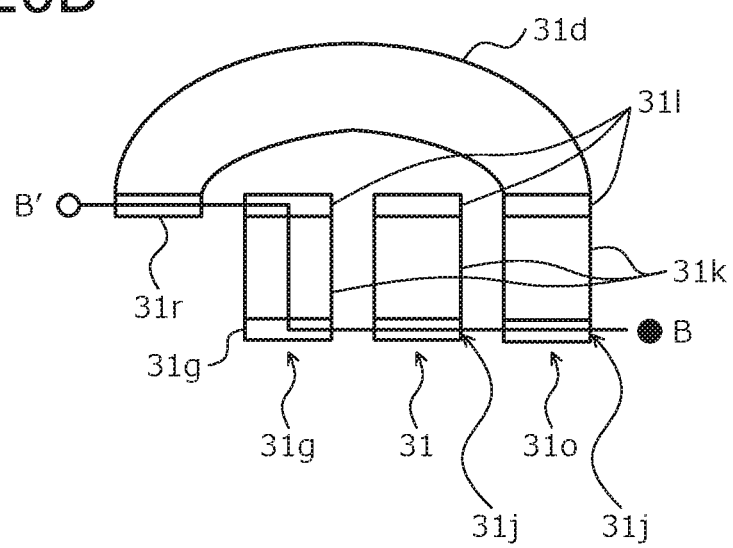
Figure 20C:
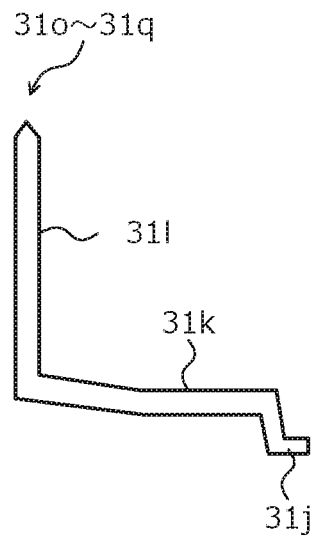

The physical quantity sensor device according to the third embodiment will be described. FIGS. 18 and 19 are cross-sectional views of the configuration of the physical quantity sensor device according to the third embodiment. FIGS. 20A, 20B, and 20C are diagrams of the configuration of the connector pins 31 depicted in FIGS. 18 and 19. A configuration of the physical quantity sensor device according to the third embodiment is obtained by providing in a commonly known configuration of a physical quantity sensor device (for example, FIGS. 12 and 13 of Japanese Laid-Open Patent Publication No. 2005-98976), the auxiliary terminal and the chip capacitors 18 between adjacent connector pins 31 as in the physical quantity sensor device according to the first embodiment.

In particular, the physical quantity sensor device according to the third embodiment differs from the physical quantity sensor device according to the first embodiment mainly on the following 4 points. The first difference is that the inner housing part 3 and the socket housing part 4 are integrally formed. The second point is that the axial direction of the lead pins 15 differs and no through-holes are provided in the connector pins 31. The third difference is that the orientation of the sensor element 1 is reversed so that the pressure sensor chip 11 is provided on the base member 12. The fourth difference is that a housing 71 that houses the pressure sensor chip 11 is provided and is integrally formed with the screw part 2 that protrudes outside the housing 71 from a bottom of the housing 71. FIG. 19 is a cross-sectional view at a position of a cross-section B-B' of the connector pins 31 depicted in FIG. 20B.

In a physical quantity sensor device 200 according to the third embodiment, the sensor element 1 is between a connector member 80 and a joint member 70, and the sensor element 1, the connector member 80, and the joint member 70 are integrated by tightening the joint member 70.

The sensor element 1 includes the case 10, the pressure sensor chip 11, the base member 12, and a metal plate member 92. Configuration of the pressure sensor chip 11 is the same as in the first embodiment. The first surface 61 of the pressure sensor chip 11 is joined to the base member 12 so that the diaphragm 11a faces a through-hole 82 of the base member 12. The case 10 is such that the lead pins 15 protrude outside. In the recess 10a of the case 10, the pressure sensor chip 11 and the base member 12 are housed, and a proximal end of the lead pins 15 is exposed. The exposed location of the lead pins 15 and the pressure sensor chip 11 are electrically connected by the bonding wire 14. A rear surface of the case 10 is adhered to a first aspect of the metal plate member 92.

The metal plate member 92, although not particularly limited, for example, contains 42 alloy and the surface thereof is plated with nickel plating or a combination of nickel plating and gold plating. At a center of the metal plate member 92, a through-hole 93 is provided. The metal plate member 92 and the base member 12 are positioned and joined by a metal material so that the through-hole 82 of the base member 12 and the through-hole 93 of the metal plate member 92 are continuous with each other.

The joint member 70 has a fixed part that is fixed to the inner housing part 3 of the connector member 80. The housing 71 that houses the pressure sensor chip 11 and the screw part 2 that protrudes outside the housing 71 from the bottom of the housing 71 are configured to be integrally formed.

The connector member 80 is integrally formed with the inner housing part 3 that houses the sensor element 1 and the socket housing part 4 for leading output of the physical quantity sensor device 200 to the outside. The socket housing part 4 is thinner than the inner housing part 3, and a step 83 is formed between the socket housing part 4 and the inner housing part 3. At a partition part of the socket housing part 4 and the inner housing part 3, the connector pins 31 are embedded.

As described, the first connector pin 31o and the fourth connector pin 31r are connected to a lead pin 15 that is a power supply terminal (FIG. 19, FIGS. 20A to 20C). The second connector pin 31p is connected to a lead pin 15 that is an output terminal (FIG. 19, FIGS. 20A to 20C). The third connector pin 31q is connected to a lead pin 15 that is a ground terminal (FIG. 19, FIGS. 20A to 20C).

The first connector pin 31o to the third connector pin 31q have a substantially L-shaped cross-sectional shape formed by a part (hereinafter, horizontal part) 31k that is embedded in the inner housing part 3, a part (hereinafter, vertical part) 31l that is continuous with the horizontal part 31k and protrudes upwardly, orthogonal to the horizontal part 31k, and an end 31j that is embedded in the inner housing part 3, is continuous with the horizontal part 31k, and protrudes downwardly, orthogonal to the horizontal part 31k (FIG. 20C). The fourth connector pin 31r has a substantially I-shaped cross-sectional shape (not depicted) having only the vertical part 31l.

Further, the first connector pin 31o has a part 31d that is connected to the end 31j of the first connector pin 31o (FIG. 20B). The part 31d of the first connector pin 31o is provided so as to surround the horizontal part 31k and the end 31j of the second connector pin 31p, and the horizontal part 31k and the end 31j of the third connector pin 31q; the part 31d of the first connector pin 31o is integrated and connected to the fourth connector pin 31r (FIG. 20B). Further, the fourth connector pin 31r is shorter than the first connector pin 31o to the third connector pin 31q and is embedded in the inner housing part 3 (FIG. 19, FIG. 20A).

The first connector pin 31o and the second connector pin 31p are connected via the chip capacitor 18a (FIG. 19). For example, the second connector pin 31p and the third connector pin 31q are connected via the chip capacitor 18b (FIG. 19). For example, the third connector pin 31q and the fourth connector pin 31r are connected via the chip capacitor 18c (FIG. 19). In FIG. 19, the chip capacitor 18c is provided at a position that is not visible in the cross-section and therefore, is indicated by a dotted line.

An end face of the sensor element 1 on the side of the sensor element 1 opposite an open end 73 thereof where a pressure inlet 94 is open, is adhered by a silicon adhesive, an epoxy adhesive, or the like to an end face (arrangement part) of the connector member 80 exposed in the inner housing part 3 of the partition part between the inner housing part 3 and the socket housing part 4 whereby the connector member 80 and the sensor element 1 are integrated. In this manner, the sensor element 1 is adhered to the connector member 80 whereby reliability against mechanical impact such as vibration and impact is improved. Further, a proximal end part of the connector pins 31 exposed in the inner housing part 3 is electrically connected to the first lead pins 15 of the sensor element 1 by laser welding.

A through-hole 81 is provided at the partition part between the inner housing part 3 and the socket housing part 4. The through-hole 81 is provided so that in the case 10 of the sensor element 1, a space of the recess 10a housing the pressure sensor chip 11 is not in a closed state. The recess 10a is filled with a gel 84 for protecting the pressure sensor chip 11.

Further, with the pressure sensor chip 11 adhered to the inner housing part 3 of the connector member 80 and the inner housing part 3 of the connector member 80 covered by the housing 71 of the joint member 70, the joint member 70 and the connector member 80 may be fixed by, for example, caulking an edge of the housing 71 along the step 83 of the connector member 80 by machine. Other than caulking, for example, adhesion may be performed as a method of fixing the joint member 70 and the connector member 80. By fixing the joint member 70 and the connector member 80, the pressure inlet 94 of the sensor element 1 is configured so as to be connected to the through-hole 23 of the screw part 2.

At the bottom of the housing 71, a recess 72 is formed. The recess 72 houses an O-ring 74 that forms a seal between the metal plate member 92 and the joint member 70. In the recess 72 of the housing 71, the O-ring 74 forms a seal between at least a side of the recess 72 and a side of the metal plate member 92. The O-ring 74 prevents the pressure medium that passes through the through-hole 23 of the screw part 2 and is led to the metal plate member 92 from flowing to parts other than the through-hole 23 of the metal plate member 92.

Between an outer side the inner housing part 3 of the connector member 80 and an inner side of the housing 71 of the joint member 70, an O-ring 91 that forms a seal therebetween is provided. The O-ring 91 prevents the pressure medium from leaking outside in cases such as, for example, when the pressure medium leaks from the metal plate member 92, the pressure sensor chip 11 is damaged, the bonding interface between the pressure sensor chip 11 and the base member 12 has peeled, etc.

Although not particularly limited, in the method of manufacturing a physical quantity sensor device according to the third embodiment, in the process of attaching the chip capacitors 18 to the connector pins 31 and the process of forming the connector pins 31 integrally with the inner housing part 3, similar the method of manufacturing a physical quantity sensor device according to the first embodiment, the chip capacitors 18 may be attached to the connector pins 31 and after the chip capacitors 18 are attached, the inner housing part 3 and the connector pins 31 may be integrally formed, or similar to the method of manufacturing a physical quantity sensor device according to the second embodiment, the inner housing part 3 and the connector pins 31 may be integrally formed and thereafter, the chip capacitors 18 may be attached to the connector pins 31 followed by the filling of the window 3g with resin. Further, in the method of manufacturing a physical quantity sensor device according the third embodiment, processes other than the process of attaching the chip capacitors 18 to the connector pins 31 and the process of forming the connector pins 31 integrally with the inner housing part 3 are similar to those of a commonly known method of manufacturing a physical quantity sensor device (for example, Japanese Laid-Open Patent Publication No. 2005-98976) and therefore, detailed description is omitted herein.

As described, according to the first, second and third embodiments, between adjacent connector pins among the connector pins integrally formed with the inner housing part, the chip capacitors are electrically joined. As a result, a noise suppressing substrate for providing the chip capacitors is not necessary, enabling the cost for the noise suppressing substrate to be saved. Further, since the process for attaching the noise suppressing substrate needs not be performed, the cost required for the process of attaching the noise suppressing substrate may be saved and assembly may be simplified. Further, since no noise suppressing substrate is present, lead pins for property adjustment/trimming need not be cut, enabling the cutting process to be omitted and assembly to be simplified.

Further, the number of connector pins is increased by one and connection is made between two connector pins. For example, the connector pins are arranged in a line, enabling attachment of the chip capacitors to be facilitated. Further, a series of terminals are provided between two connector pins for the power-supply signal. Among the two pins for the power-supply signal, the horizontal part of the connector pin connected to the lead pin is provided so as to surround the horizontal parts of the connector pins for the ground signal and the sensor signal, and is connected to the connector pin that is among the two pins for the power-supply signals and not connected to the lead pin. As a result, the chip capacitors may be provided between the connector pins that correspond to the ground signal, the power-supply signal, and the sensor signal, respectively. Thus, the EMC capability improves as compared to a case where only two chip capacitors are provided.

The present invention is not limited to the described first, second, and third embodiments, and may be variously modified within a scope not deviating from the spirit of the invention. For example, in the described embodiments, while a pressure sensor device has been described as an example, without limitation to the described embodiments, for example, the invention is further applicable to a physical quantity sensor device that detects a physical quantity other than pressure such as acceleration, gyro (angle, angular velocity), flow, temperature, etc. Further, in the above embodiments, while a strain gauge type pressure sensor chip has been described as an example, the present invention is further applicable to a semiconductor piezoresistor type, an electrostatic capacitance type, and a silicon resonant type pressure sensor chip.

Further, for example, in the first and second embodiments, an example is described that uses the two members: the inner housing part and the socket housing part. This configuration facilitates welding of the first lead pin and the connector pins by performing laser welding before attaching the socket housing part in a case where the first lead pin and the connector pins are to be laser welded. However, in a case where the physical quantity sensor device is sufficiently large, and laser welding of the first lead pin and the connector pins may be performed after the socket housing part is attached, as shown in the third embodiment, the inner housing part and the socket housing part may be integrally resin molded. In this case, when the inner housing part and the socket housing part are integrally formed, connector pins to which the chip capacitors are attached may be formed by insert molding. In the method of manufacturing a physical quantity sensor device having a housing part (first housing part) in which the inner housing part and the socket housing part are integrally formed, the connector pins to which the chip capacitors are attached by the joining members are placed in a mold for molding the housing part and a resin material is flowed into the mold whereby the connector pins and the housing part that includes the inner housing part and the socket housing part are integrally formed.

According to the present invention, cost reductions of the physical quantity sensor device may be facilitated. Further, according to the present invention, the physical quantity sensor device may be assembled simply.

As described, the method of manufacturing a physical quantity sensor device and the physical quantity sensor device according to the present invention are useful for physical quantity sensor devices that have a sensor chip to which pressure is applied from a recess side (diaphragm side) of a case and are particularly suitable for pressure sensor devices.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of manufacturing a physical quantity sensor device, wherein the physical quantity sensor device includes:
   a sensor;
   a control circuit electrically connected to the sensor;
   a first housing part that is a resin member, having external lead terminals electrically connected to the control circuit, each external lead terminal including a connector part for connecting to external wiring, each connector part extending axially from the first housing part; and
   an auxiliary terminal electrically connected at a first end of the auxiliary terminal with a first external lead terminal, and arranged in the first housing part such that an axially-extending portion of the auxiliary terminal is closer to an axially-extending portion of a second external lead terminal than to an axially-extending portion of the first external lead terminal,
   the method comprising:
   electrically joining a capacitor between each pair of adjacent terminals among the auxiliary terminal and the external lead terminals.

2. The method according to claim 1, wherein the physical quantity sensor device includes:
   a measured-medium intake part that has an intake hole that guides a measured medium that is one of a gas subject to measurement and a liquid subject to measurement; and
   a sensor element arranged so as to cover the intake hole at one end of the intake hole of the measured-medium intake part, the sensor element having a sensor chip that includes the sensor and the control circuit,
   the first housing part includes:
      a second housing part that sandwiches the sensor element with the measured-medium intake part and that houses first terminals that are electrically connected with the control circuit and arranged in the sensor element, the auxiliary terminal and the external lead terminals being arranged in the second housing part; and
      a third housing part that sandwiches the second housing part with the sensor element and that houses the external lead terminals and the auxiliary terminal.

3. The method according to claim 2, comprising:
   fixing the second housing part to the sensor element by inserting second terminals into grooves of the second housing part, the second terminals that arranged in the sensor element, and the second terminals being for one or both of trimming and adjustment of the control circuit.

4. The method according to claim 3, wherein the second terminals and the first terminals have a same length.

5. The method according to claim 3, comprising:
   fixing the third housing part to the second housing part, wherein fixing the third housing part to the second housing part includes inserting the external lead terminals into through-holes of the third housing part to expose the external lead terminals from the third housing part.

6. The method according to claim 2, wherein the external lead terminals are integrated with the second housing part, the external lead terminals each having a first part embedded in the second housing part and a second part protruding outside the second housing part,
   the auxiliary terminal is integrated with the second housing part,
   the first part of the first external lead terminal is connected to the auxiliary terminal,
   the method comprising:
   fixing the second housing part to the sensor element, wherein fixing the second housing part to the sensor element includes electrically connecting the first terminals and the first part of one or more of the external lead terminals exposed in through-holes provided in the second housing part.

7. The method according to claim 6, wherein the external lead terminals and the auxiliary terminal are arranged axially in a line.

8. The method according to claim 7, wherein the auxiliary terminal and the first external lead terminal are at opposite ends of the line.

9. The method according to claim 2, wherein the second housing part has a window in which parts for attaching the capacitor to the auxiliary terminal and the external lead terminals are exposed,
   the method comprising filling the window with a resin material after electrically joining the capacitor between the adjacent terminals among the auxiliary terminal and the respective adjacent external lead terminals,
   wherein electrically joining the capacitor between the adjacent terminals among the auxiliary terminal and the external lead terminals includes electrically joining the capacitor between the adjacent terminals exposed by the window.

10. A physical quantity sensor device comprising:
    a sensor;
    a control circuit electrically connected to the sensor;
    a first housing part that is a resin member, in which external lead terminals, each having a connector part for connecting to external wiring, are arranged;
    an auxiliary terminal electrically connected at one end with a first external lead terminal and arranged in the first housing part, such that an axially-extending portion of the auxiliary terminal is closer to an axially-extending portion of a second external lead terminal than to an axially-extending portion of the first external lead terminal; and
    a capacitor electrically joined between each pair of adjacent terminals among the auxiliary terminal and the external lead terminals.

11. The physical quantity sensor device according to claim 10, comprising:
    a measured-medium intake part that has an intake hole that guides a measured medium that is one of a gas subject to measurement and a liquid subject to measurement;
    a sensor element arranged so as to cover the intake hole at one end of the intake hole of the measured-medium intake part, the sensor element having a sensor chip that includes the sensor and the control circuit; and
    first terminals arranged in the sensor element,
    wherein the first housing part includes:
       a second housing part that sandwiches the sensor element with the measured-medium intake part and that houses the first terminals, the auxiliary terminal and the external lead terminals being arranged in the second housing part, and a third housing part that sandwiches the second housing part with the sensor element and that houses the external lead terminals and the auxiliary terminal.

12. The physical quantity sensor device according to claim 11, comprising:

second terminals that are arranged in the sensor element and that are for one or both of trimming and adjustment of the control circuit, wherein the second terminals are housed in grooves of the second housing part.

13. The physical quantity sensor device according to claim 12, wherein the second terminals and the first terminals have a same length.

14. The physical quantity sensor device according to claim 11, wherein the external lead terminals are integrated with the second housing part, the external lead terminals each having a first part embedded in the second housing part and a second part protruding outside the second housing part, the auxiliary terminal is integrated with the second housing part, the first part of the first external lead terminal is connected with the auxiliary terminal, and the first terminals and the first part of one or more of the external lead terminals exposed in through-holes provided in the second housing part are electrically connected.

15. The physical quantity sensor device according to claim 14, wherein the axial portions of the external lead terminals and the axial portion of the auxiliary terminal are arranged in a line.

16. The physical quantity sensor device according to claim 15, wherein the auxiliary terminal and the first external lead terminal are at opposite ends of the line.

17. The physical quantity sensor device according to claim 14, wherein the external lead terminals penetrate through-holes of the third housing part and are exposed from the third housing part, and the auxiliary terminal is housed in a groove of the third housing part.

* * * * *